United States Patent
Kainulainen et al.

(10) Patent No.: US 11,419,009 B2
(45) Date of Patent: Aug. 16, 2022

(54) METHODS PROVIDING QFI HARMONIZATION BETWEEN RAN AND 5GC AND RELATED WIRELESS TERMINALS, BASE STATIONS, AND CORE NETWORK NODES

(71) Applicant: Telefonaktiebolaget LM Ericsson (publ), Stockholm (SE)

(72) Inventors: Jani-Pekka Kainulainen, Kirkkonummi (FI); Henrik Enbuske, Stockholm (SE); Paul Schliwa-Bertling, Ljungsbro (SE); Ylva Timner, Lulea (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/969,028

(22) PCT Filed: Feb. 15, 2019

(86) PCT No.: PCT/EP2019/053824
§ 371 (c)(1),
(2) Date: Aug. 11, 2020

(87) PCT Pub. No.: WO2019/158699
PCT Pub. Date: Aug. 22, 2019

(65) Prior Publication Data
US 2021/0037425 A1 Feb. 4, 2021

Related U.S. Application Data

(60) Provisional application No. 62/631,423, filed on Feb. 15, 2018.

(51) Int. Cl.
*H04W 28/12* (2009.01)
*H04W 76/27* (2018.01)
*H04W 28/02* (2009.01)

(52) U.S. Cl.
CPC ....... *H04W 28/12* (2013.01); *H04W 28/0263* (2013.01); *H04W 28/0268* (2013.01); *H04W 76/27* (2018.02)

(58) Field of Classification Search
CPC ..... H04W 28/02; H04W 28/12; H04W 76/27; H04W 28/10; H04W 28/24; H04W 80/04;
(Continued)

(56) References Cited

U.S. PATENT DOCUMENTS

2018/0324631 A1* 11/2018 Jheng ................ H04W 28/0268
2019/0029057 A1* 1/2019 Pan ................... H04W 28/0268
(Continued)

FOREIGN PATENT DOCUMENTS

ER    3435700 A1    1/2019

OTHER PUBLICATIONS

International Search Report and Written Opinion of the International Searching Authority, PCT/EP2019/053824, dated Jul. 25, 2019, 29 pages.
(Continued)

*Primary Examiner* — Nathan S Taylor
(74) *Attorney, Agent, or Firm* — Sage Patent Group

(57) ABSTRACT

Methods may be provided to operate a wireless terminal in communication with a base station. Such methods may include receiving a Radio Resource Control RRC message from the base station, wherein the RRC message includes information regarding at least one Quality of Service, QoS, flow being reflective and/or non-reflective. Such methods may also include providing communication of a data packet between the wireless terminal and the base station using a non-reflective QoS flow, wherein the data packet includes a data field and a Service Data Application Protocol SDAP header field with a QoS Flow Identity QFI, and wherein the QFI is used for the data packet based on the information
(Continued)

from the RRC message. Methods of operating base stations and core network nodes may also be provided. Related wireless terminals, base stations, and core network nodes are also discussed.

20 Claims, 10 Drawing Sheets

(58) Field of Classification Search
CPC ......... H04W 28/0268; H04W 28/0263; H04W 28/0252
See application file for complete search history.

(56) References Cited

U.S. PATENT DOCUMENTS

| | | | | |
|---|---|---|---|---|
| 2019/0150023 | A1* | 5/2019 | Cho | H04W 28/0268 370/235 |
| 2019/0253917 | A1* | 8/2019 | Dao | H04L 12/1407 |
| 2020/0128430 | A1* | 4/2020 | Yi | H04W 28/0268 |
| 2020/0154304 | A1* | 5/2020 | Cho | H04W 28/02 |
| 2020/0296618 | A1* | 9/2020 | You | H04W 28/0263 |
| 2020/0389809 | A1* | 12/2020 | Jiang | H04L 69/22 |
| 2021/0144588 | A1* | 5/2021 | Tang | H04W 76/36 |
| 2021/0160727 | A1* | 5/2021 | Jiang | H04W 28/0226 |
| 2021/0352521 | A1* | 11/2021 | Pan | H04W 76/12 |

OTHER PUBLICATIONS

International Preliminary Reporton Patentability, PCT/EP2019/053824, dated Jun. 22, 2020, 21 pages.

Huawei, Hisilicon, "Reflective Mapping in AS", 3GPP TSG-RAN2 Meeting #97bis Spokane, Washington, USA, Apr. 3-7, 2017, R2-1702613, 4 pages.

Xiaomi, "Details of one byte SDAP Header Format", 3GPP TSG-RAN2 NR AH-1801 Vancouver, Canada, Jan. 22-26, 2018, R2-1800233, 4 pages.

3GPP TS 37.324 V1.1.0 (Oct. 2017), 3rd Generation Partnership Project; Technical Specification Group Radio Access Network; E-UTRA and NR; Service Data Adaptation Protocol (SDAP) specification (Release 15), 15 pages.

CMCC, "Shorter QFI in SDAP header", 3GPP TSG-RAN WG2 Meeting #101 Athens, Greece, Feb. 26-Mar. 2, 2018, R2-1803535, 4 pages.

Huawei, Hisilicon, "Further discussion on SDAP Header Format", 3GPP TSG-RAN WG2 Meeting AH 1801 Vancouver, Canada, Jan. 22-26, 2018, R2-1800262, 4 pages.

Intel Corporation, "QFI in SDAP header", 3GPP TSG-RAN WG2 Ad hoc 1801 Vancouver, Canada, Jan. 22-26, 2018, Tdoc R2-1800940, 2 pages.

Ericsson, "Issues with the Existing QoS Framework (Stage 3)", 3GPP TSG-RAN WG2 #100 Reno, Nevada, USA, Nov. 27-Dec. 1, 2017, Tdoc R2-1712920, 6 pages.

Ericsson, "SDAP QFI mapping between AS and NAS", 3GPP TSG-RAN WG2 #101 Athens, Greece, Feb. 26-Mar. 2, 2018, R2-1803157, 6 pages.

Ericsson, "SDAP Header Format", 3GPP TSG-RAN WG2 NR AH#1801 Vancouver, Canada, Jan. 22-26, 2018, Tdoc R2-1800698, 3 pages.

Xiaomi, "Open issues of SDAP", 3GPP TSG-RAN2 NR AH-1801 Vancouver, Canada, Jan. 22-26, 2018, R2-1800230, 2 pages.

* cited by examiner

METHODS PROVIDING QFI HARMONIZATION BETWEEN RAN AND 5GC AND RELATED WIRELESS TERMINALS, BASE STATIONS, AND CORE NETWORK NODES

CROSS REFERENCE TO RELATED APPLICATIONS

This application is a 35 U.S.C. § 371 national stage application of PCT International Application No. PCT/EP2019/053824 filed on Feb. 15, 2019, which claims the benefit of priority from U.S. Provisional Application No. 62/631,423, filed Feb. 15, 2018. The disclosure and content of both of the above referenced applications are incorporated by reference herein in their entirety.

TECHNICAL FIELD

The present disclosure relates to communications, and more particularly, to wireless communications and related wireless terminals, base stations, and network nodes.

BACKGROUND

The 5G System design supports data connectivity and services, enabling deployments to use a variety of technologies e.g. Network Function Virtualization and Software Defined Networking. The 5G System leverages service-based interactions between Control Plane (CP) Network Functions.

To enable independent scalability, evolution and flexible deployments (e.g., centralized location or distributed/remote location), 5G system designs have separated User Plane (UP) functions from Control Plane (CP) Functions. Additionally, such systems are designed to be modular so that flexible and efficient network slicing may be enabled.

5G core architecture aims to reduce/minimize dependencies between the Access Network and the Core Network (CN) and to define common AN-CN interfaces to allow a variety of Radio Access Technologies to connect to the core. This may enable 3GPP as well as non-3GPP access technologies to have access the 5G core network. [3GPP TS 23.501]

5G system architecture with 3GPP access is discussed below.

5G systems may support a Service Based architecture where network functions, such as Access and Mobility Management Function (AMF), within the Control Plane (CP) enable authorized network functions to access services. This representation may also include point-to-point reference points where necessary.

FIG. 1 presents reference point representation, which shows interaction between the Network Function services described by point-to-point reference point (e.g., N11) between any two network functions (e.g. AMF and SMF). FIG. 1 is thus a block diagram illustrating elements of a 5G architecture.

5G QoS in RAN is discussed below.

5G QoS includes entities that are established end-to-end by creating consistent packet forwarding treatment between UE and peer. As the 5G Core Network is responsible for managing packet treatment among many network users, QoS behavior of each UE may be needed. Based on configured or standardized the profiles that hold QoS information, network equipment may decide treatment of the packet that is consistent with the intended network behavior for the specific UE. In order to orchestrate the end-to-end system, several components, such as PDU session, QFI and DRB are defined in 5G system. FIG. 2 is a diagram illustrating High-level components of a 5G QoS system.

PDU sessions are discussed below.

A 5G PDU Session is an association between the UE and a Data Network that provides a PDU connectivity service, where Packet Data Units (PDUs) are exchanged between UE and Data Network (DN) (see FIG. 1 for reference). The type of association can be IP, Ethernet or unstructured. A UE may have multiple simultaneous PDU sessions.

QoS parameters in a PDU session are discussed below.

Traffic rate of the UE may be controlled per PDU session according to an Aggregated Maximum Bit Rate (AMBR). Additionally, each UE is associated with the per UE Aggregated Maximum Bit Rate (UE-AMBR). The UE-AMBR limits the aggregate bit rate that can be expected to be provided across all Non-GBR QoS flows of a UE. UE-AMBR is enforced by the Radio Access Network RAN. UE-AMBR information is provided by AMF or SMF.

QoS flow is the finest granularity of QoS differentiation in a PDU session. QoS flows are unique inside PDU session and a QoS Flow Indicator is assigned to each QoS flow. NAS QoS flow is marked in UPF function. User Plane traffic with the same QFI within a PDU session receives the same traffic forwarding treatment. The QFI is carried in an encapsulation header on N3 (and N9) (i.e., without any changes to the e2e packet header). It can be applied to PDUs with different types of payload, i.e. IP packets, unstructured PDUs and Ethernet frames. QFI is associated with the 5QI information that provides QoS parameter information for RAN. Flows inside same PDU session may use same 5QI. QoS flows may be configured as guaranteed bit rate flows or non-guaranteed bit-rate flows.

A QoS flow is associated with parameters defined in 3GPP TS 23.501. These parameters include 5QI, QoS flow type (GBR or non-GBR), UL and DL GBFR rate, and notification control parameters. Additionally, a Reflective QoS attribute may be carried in QoS flow (RQA).

A Radio Protocol Architecture is discussed below.

In a 5G system, a UE has control plane connections to gNB and AMF entities. Connection to the AMF entity is defined as NAS connection and the gNB connection is defined as an RRC connection. These connections may allow the UE to communicate with 5GC and RAN (gNB).

User Plane QoS handling may be provided using an SDAP layer, which is on top of a PDCP layer. Responsibilities of an SDAP layer may include marking of QFI and mapping of QoS flow to DRB.

FIG. 3 illustrates an overall RAN protocol architecture where SDAP layer is provided according to TS 37.324.

DL and UL QoS frameworks are discussed below.

FIG. 4 is a diagram illustrating an overview of the downlink DL QoS Framework for New Radio NR.

FIG. 5 is a diagram illustrating an UpLink UL QoS framework.

For more information about the a QoS framework and associated problems, 3GPP contribution for RAN2#100 discusses issues with existing QoS frameworks.

Access Stratum AS reflective QoS, or AS reflective QFI to DRB mapping is a mechanism that allows the Radio Access Network RAN to change a UE's QFI to DRB mapping without Radio Resource Control RRC signalling. The mechanism is described in http://www.3gpp.org/ftp/Specs/latest-drafts/37324-101.zip.

NAS reflective QoS is described in 3GPP TS 23.501 http://www.3gpp.org/ftp/Specs/latest-drafts/23501-140.zip.

Reflective QoS is controlled on per-packet basis by using the Reflective QoS Indication (RQI) in the encapsulation header on N3 reference point together with the QFI, together with a Reflective QoS Timer (RQ Timer) value that is either signaled to the UE upon PDU Session establishment or set to a default value.

The RQA (Reflective QoS Attribute) within a QoS flow's QoS profile provided by the SMF to the NG-RAN on N2 reference point indicates that some (not necessarily all) traffic carried on this QoS flow is subject to Reflective QoS. The RQA is indicated to NG-RAN at UE context establishment in NG-RAN and at QoS flow establishment.

When the 5GC determines to use reflective QoS for a specific SDF, the SMF shall include an indication to use reflective QoS that Reflective QoS is to be applied for this SDF in the corresponding SDF information provided to the UPF via N4 interface.

When the UPF receives this indication for an SDF, the UPF shall set the RQI bit in the encapsulation header on the N3 reference point for every DL packet corresponding to this SDF.

When an RQI is received by (R)AN in a DL packet on N3 reference point, the (R)AN shall indicate to the UE the QFI and that this DL packet is subject to Reflective QoS.

The Reflective QoS Attribute (RQA) is an optional parameter that, in the case of NG-RAN, may be signalled to RAN via N2 when Reflective QoS control is used, as described in clause 5.7.5.4. The RQA indicates that certain traffic on this QoS flow may be subject to Reflective QoS.

The Radio Access Network (RAN) and the Core Network (CN) may use different sizes of QFI, and these differences may cause problems relating to differences in value ranges.

SUMMARY

According to some embodiments of inventive concepts, a method may be provided to operate a wireless terminal in communication with a base station. The method may include receiving a Radio Resource Control RRC message from the base station, wherein the RRC message includes information regarding at least one Quality of Service QoS flow being reflective and/or non-reflective. The method may also include providing communication of a data packet between the wireless terminal and the base station using a non-reflective QoS flow, wherein the data packet includes a data field and a Service Data Application Protocol SDAP header field with a QoS Flow Identity QFI, and wherein the QFI is used for the data packet based on the information from the RRC message.

According to some other embodiments of inventive concepts, a method may be provided to operate a wireless terminal in communication with a base station. The method may include providing communication of a data packet between the wireless terminal and the base station using a Quality of Service QoS, flow. The QoS flow is either a reflective QoS flow or a non-reflective QoS flow, the data packet includes a data field and a Service Data Application Protocol SDAP header field, and a format of the SDAP header field is determined based on the QoS flow being a reflective QoS flow or a non-reflective QoS flow.

According to still other embodiments of inventive concepts, a method may be provided to operate a base station of a wireless communication network in communication with a wireless terminal. The method may include receiving information from a Core Network CN node regarding at least one Quality of Service QoS flow being reflective and/or non-reflective, and transmitting a Radio Resource Control RRC message to the wireless terminal based on the information regarding at least one Quality of Service QoS flow being reflective and/or non-reflective. The method may also include providing communication of a data packet between the base station and the wireless terminal using a non-reflective QoS flow, wherein the data packet includes a data field and a Service Data Application Protocol SDAP header field with a QoS Flow Identity QFI, and wherein the QFI is used for the data packet based on the information from the CN node.

According to yet other embodiments of inventive concepts, a method may be provided to operate a base station of a wireless communication network in communication with a wireless terminal. The method may include providing communication of a data packet between the base station and the wireless terminal using a Quality of Service QoS flow, wherein the QoS flow is either a reflective QoS flow or a non-reflective QoS flow, wherein the data packet includes a data field and a Service Data Application Protocol SDAP header field, and wherein a format of the SDAP header field is determined based on the QoS flow being a reflective QoS flow or a non-reflective QoS flow.

According to more embodiments of inventive concepts, a method may be provided to operate a core network CN node of a wireless communication network. The method may include determining that a reflective Quality of Service QoS flow will be established for a 3GPP access between a base station and a wireless terminal using a 5G QoS indicator 5QI having a value greater than a threshold. The method may also include, responsive to the reflective QoS flow being established for the 3GPP access using the 5QI having the value greater than the threshold, transmitting information regarding the reflective QoS flow to the base station, wherein the information regarding the reflective QoS flow includes a QoS Flow Identity QFI and the 5QI having the value greater than the threshold.

According to some embodiments disclosed herein a wireless terminal, UE, is operated as follows:
  receiving from the base station (gNB or eNB) a configuration indicative of a QoS Flow Identity, QFI, mapping of non-access stratum, NAS QFI values to access stratum, AS QFI values,
  exchanging data traffic with the base station associated to an AS QFI value, and
  determining the NAS QFI as follows:
    if the AS QFI value is below 64, the UE uses the AS QFI value as NAS QFI value,
    else if the AS QFI value is greater 63, the UE uses a NAS QFI value indicated by the mapping received from the base station.

According to some embodiments disclosed herein a base station (gNB or eNB) is operated as follows:
  sending to the UE a configuration indicative of a QoS Flow Identity, QFI, mapping of non-access stratum, NAS QFI values to access stratum, AS QFI values,
  wherein the mapping comprises information for determining the NAS QFI as follows:
    if the AS QFI value is below 64, using the AS QFI value as NAS QFI value,
    else if the AS QFI value is greater 63, the using a NAS QFI value indicated by the mapping.

According to some embodiments disclosed herein, an impact of integrating a radio access network and a 5G core network may be reduced, and/or an increased range of QFIs may be supported.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 8:
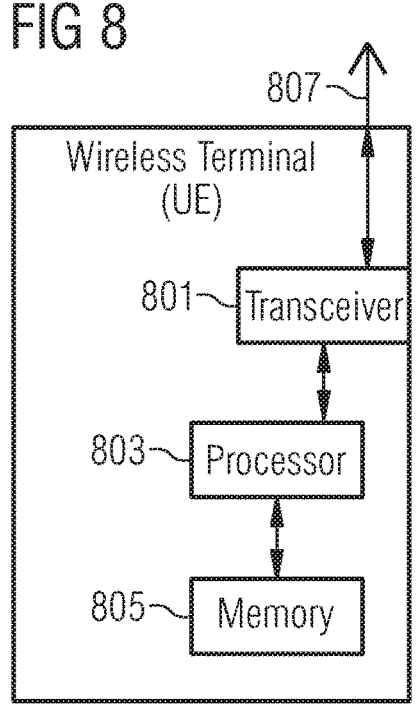
FIG. 8 is a block diagram illustrating elements of a wireless terminal UE according to some embodiments of inventive concepts.

FIG. 8 is a block diagram illustrating elements of a wireless terminal UE (also referred to as a wireless device, a wireless communication device, a mobile terminal, a wireless communication terminal, user equipment, a user equipment node/terminal/device, etc.) configured to provide wireless communication according to embodiments of inventive concepts. As shown, wireless terminal UE may include an antenna 807, and a transceiver circuit 801 (also referred to as a transceiver) including a transmitter and a receiver configured to provide uplink and downlink radio communications with a base station of a radio access network. Wireless terminal UE may also include a processor circuit 803 (also referred to as a processor) coupled to the transceiver circuit, and a memory circuit 805 (also referred to as memory) coupled to the processor circuit. The memory circuit 805 may include computer readable program code that when executed by the processor circuit 803 causes the processor circuit to perform operations according to embodiments disclosed herein. According to other embodiments, processor circuit 803 may be defined to include memory so that a separate memory circuit is not required. Wireless terminal UE may also include an interface (such as a user interface) coupled with processor 803, and/or wireless terminal UE may be incorporated in a vehicle.

As discussed herein, operations of wireless terminal UE may be performed by processor 803 and/or transceiver 801. For example, processor 803 may control transceiver 801 to transmit communications through transceiver 801 over a radio interface to a base station gNB and/or to receive communications through transceiver 801 from a base station over a radio interface. Moreover, modules may be stored in memory 805, and these modules may provide instructions so that when instructions of a module are executed by processor 803, processor 803 performs respective operations (e.g., operations discussed below with respect to Example Embodiments).

Figure 9:
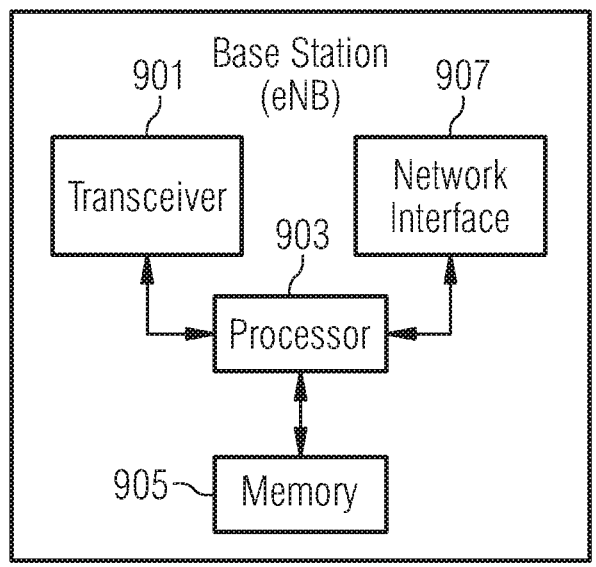
FIG. 9 is a block diagram illustrating elements of a base station according to some embodiments of inventive concepts.

FIG. 9 is a block diagram illustrating elements of a base station (also referred to as a network node, base station, eNodeB, eNB, gNodeB, gNB, etc.) of a Radio Access Network (RAN) configured to provide cellular communication according to embodiments of inventive concepts. As shown, the base station may include a transceiver circuit 901 (also referred to as a transceiver) including a transmitter and a receiver configured to provide uplink and downlink radio communications with wireless terminals. The base station may include a network interface circuit 907 (also referred to as a network interface) configured to provide communications with other nodes (e.g., with other base stations and/or other entities) of the RAN and/or a local area network. The base station may also include a processor circuit 903 (also referred to as a processor) coupled to the transceiver circuit, and a memory circuit 905 (also referred to as memory) coupled to the processor circuit. The memory circuit 905 may include computer readable program code that when executed by the processor circuit 903 causes the processor circuit to perform operations according to embodiments disclosed herein. According to other embodiments, processor circuit 903 may be defined to include memory so that a separate memory circuit is not required.

As discussed herein, operations of the base station may be performed by processor 903, network interface 907, and/or transceiver 901. For example, processor 903 may control transceiver 901 to transmit communications through transceiver 901 over a radio interface to one or more wireless terminals UEs and/or to receive communications through transceiver 901 from one or more wireless terminals UEs over a radio interface. Similarly, processor 903 may control network interface 907 to transmit communications through network interface 907 to one or more other network nodes/entities and/or to receive communications through network interface from one or more other network nodes/entities. Moreover, modules may be stored in memory 905, and these modules may provide instructions so that when instructions of a module are executed by processor 903, processor 903 performs respective operations.

Figure 10:
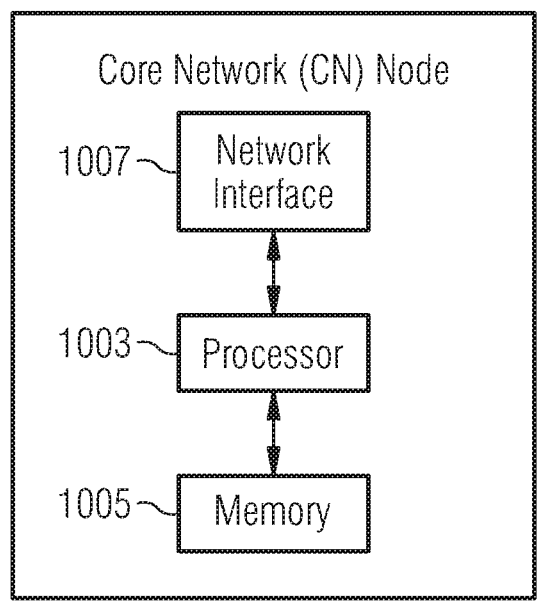
FIG. 10 is a block diagram illustrating elements of a Core Network CN node according to some embodiments of inventive concepts.

FIG. 10 is a block diagram illustrating elements of a Core Network CN node (e.g., an AMF entity/node, an SMF entity/node, UPF entity/node, or any other control entity/node of the core network CN) configured to support cellular communication according to embodiments of inventive concepts. As shown, the CN node may include a network interface circuit 1007 (also referred to as a network interface) configured to provide communications with other network entities/nodes (e.g., with a base station and/or with another CN node of the RAN and/or CN). The CN node may also include a processor circuit 1003 (also referred to as a processor) coupled to the network interface circuit 1007, and a memory circuit 1005 (also referred to as memory) coupled to the processor circuit. The memory circuit 1005 may include computer readable program code that when executed by the processor circuit 1003 causes the processor circuit to perform operations according to embodiments disclosed herein. According to other embodiments, processor circuit 1003 may be defined to include memory so that a separate memory circuit is not required.

As discussed herein, operations of the CN node may be performed by processor 1003 and/or network interface 1007. For example, processor 1003 may control network interface 1007 to transmit communications through network interface 1007 to one or more other network nodes/entities and/or to receive communications through network interface from one or more other network nodes/entities. Moreover, modules may be stored in memory 1005, and these modules may provide instructions so that when instructions of a module are executed by processor 1003, processor 1003 performs respective operations. As noted above, the structure of the CN node of FIG. 10 may be used, for example, to implement an Access and Mobility Function AMF entity/node, a Session Management Function SMF entity/node, a User Plane Function UPF entity/node, and/or a control entity/node (also referred to as a controller) to perform operations thereof as discussed in greater detail below. Operations of a CN node of FIG. 10, for example, may be performed by one server or distributed across a plurality of network servers having the structure of FIG. 10, and a plurality of such distributed servers may be collectively referred to as a server.

Currently, RAN 2 has agreed to use 6-bit QFI while 5GC is assumed that 7-bit QFI is used. This may create a problem with the value ranges (6-bit, max 64 values and 7-bit max 128 values).

In the January 2018-AH meeting RAN2 agreement was reached regarding the following points.

Agreements
=>Support independent AS and NAS reflective QoS.
=>From RAN2 perspective supporting up to 64 reflective flows per PDU session per UE is sufficient at the same time, so 6 bits QFI in SDAP.
=>Ask SA2/CT1 if they expect to use more than 64 reflective flows per PDU session per UE at a time. Indicate RAN2 agreement and strong need to have 6 bits SDAP.
Questions will be included in SA2 LS from main session.
For future study FFS if final QFI in CT1/SA2 is larger than 6 bits, a mechanism to remap NAS QFI to AS QFI may be needed.

According to some embodiments of inventive concepts, impact on RAN and/or 5GC may be reduced/minimized while supporting an increased/maximum range of QFIs.

A 6-bit indication of QFI in the SDAP header is one format that may be realized. In addition, explicit bits may be used for NAS reflective QoS as well as AS reflective QoS. From a perspective of code points needed for complete QoS mapping of 5Qis, the QFI value should be at least 7-bits. However, this assumption may not be met. Therefore, alternative solutions should be explored.

Observation 1 A 6-bit QFI only may be available although 7-bits may be required.

Two main approaches can be seen on this topic. One is to limit the impact of the QFI to RAN (i.e., to have local QFI in RAN). Another option is to push the impact of 6-bit QFI to 5GC and have a 6-bit QFI limitation for the whole system. It is worth of noticing that even if RAN tries to absorb the impact of this change, the SMF may still need to respect the limit of 64 configured QFIs per PDU session. In general, having an additional layer of mapping on RAN in QFI would unbind the NAS and AS QFI, resulting that 5GC could potentially have support for 8-bit QFI. On the other hand, the 2-level mapping may require that RAN would need to have QFI processing on per packet basis (assuming that multiple QFIs are mapped per DRB).

Observation 2—There may be two main approaches, either RAN adapts to CN or CN adapts to RAN on 3GPP access case.

Additional impact on 6-bit QFI in 5GC is that a QFI value cannot anymore be bound to the 5QI value in 5GC. With the 7-bit QFI, it would have been possible to indicate 5QI value directly with the QFI value. This may no longer be possible for values exceeding 63. One option then is to reshuffle the 5QI table so that all standardized 5QI's are below 64, but that may impact NR-LTE interworking, and operator adaptation may be required. Another option is to always signal both QFI and 5QI when the 5QI is above 64.

Observation 3—Having 6-bit QFI values on 5GC would for 5QI's above 64 prevent 5QI used as QFI.

Option 1: 7-Bit QFI may be used in 5GC, mapping to 6 bits in RAN.

One approach is to use 7-bit QFI in 5GC, which the gNB would then map into local to a RAN 6-bit AS-QFI value. This approach may require that RAN always RRC configures the UE so that there is a mapping from NAS QFI to RAN QFI. Additional impact of this option is that the NAS reflective QoS behaviour is slightly modified as RAN is required to send the NAS-QFI to AS-QFI mapping to the UE whenever a new QFI appears on system. Otherwise the UE would not be able to resolve the AS-QFI from the NAS-QFI in uplink UL Traffic.

One benefit of this approach is that if a QFI value is extended in RAN in the future, there would not be 5GC impact, except for the SMF.

UE RRC: UE is configured (per DRB) with mapping from NAS-QFI to AS-QFI
   DL: UE receives AS-QFI and maps it to NAS-QFI
   UL: UE uses NAS-QFI on NAS-level and marks NAS-QFI on RAN. (SDAP is responsible of mapping the NAS-QFI to AS-QFI)
RAN RRC: Ran configures UE with NAS-QFI to AS-QFI mapping
   DL: Mapping of AS-QFI to NAS-QFI
   UL: RAN resolves AS-QFI to NAS-QFI towards UPF.
5GC SMF: Enforces the limit of 64 QFIs per PDU session
UPF: Marks QFI to N3 (NG-U) header Summary of option 1: RAN uses 6-bit QFI, 5GC uses 7-bit QFI. RAN maps NAS-QFI to local AS-QFI always. SMF limits the maximum number of QFIs to 64.

Option 2: 7 Bit QFI may be used in 5GC, Mapping to 6 bits in RAN when needed.

In an alternative option, where RAN uses 6-bit QFI and 5GC uses 7-bit QFI, there is a 1 to 1 mapping of NAS-QFI to AS-QFI for values that are below or equal to 63. For values exceeding 63, RAN would signal NAS-QFI to AS-QFI mapping. The SMF would need to limit the maximum number of QFI values to 64.

UE RRC: UE is configured (per DRB) with mapping from NAS-QFI to AS-QFI for NAS
   QFI values that exceed 63. UE enables mapping functionality for QFI based on RAN signalling.
   DL: For QFIs<=63, NAS-QFI==AS QFI. For QFIs>63, UE receives AS-QFI and maps it to NAS-QFI
   UL: For QFIs<=63, NAS-QFI==AS QFI. For QFIs>63, UE uses NAS-QFI on NAS-level and marks AS-QFI on RAN based on SDAP mapping. (SDAP is responsible for mapping the NAS-QFI to AS-QFI)

RAN RRC: QFIs>63, Ran configures UE with NAS-QFI to AS-QFI mapping.
   DL: Mapping of AS-QFI to NAS-QFI
   UL: RAN resolves AS-QFI to NAS-QFI towards UPF.

5GC SMF: Enforces the limit of 64 QFIs per PDU session
   UPF: Marks QFI to N3 (NG-U) header
   Summary of Option 2: RAN uses 6-bit QFI, 5GC uses 7-bit QFI. RAN uses same QFI as 5GC for values below or equal to 63 and has explicit mapping for values above 64. SMF limits the maximum number of QFIs to 64
   Option 3: QFI may be limited to 6 Bit in CN for 3GPP Access.

An alternative approach is to have 6-bit QFI for 3GPP access. This option has most impact on 5GC. Additionally, the limit may potentially be only enforced on 3GPP access, i.e. non 3GPP access could still use higher values and use standardized 5QI values beyond 63 as QFI. On this approach, SMF would limit the maximum QFI value to 64 for 3GPP access and UPF would mark QFIs up to 64. For 5QI values above 64, both the 5QI and a dynamic QFI would be signaled.

UE NAS-QFI==AS QFI
RAN NAS-QFI==AS QFI
5GC SMF: Enforces the limit of 64 QFIs per PDU session
   UPF: Marks 6-bit QFI on N3 for 3GPP access.
   It is up to SA2 to decide whether this option is viable
   Summary of option 3: RAN uses 6-bit QFI, 5GC uses 7-bit QFI. RAN uses same QFI as 5GC for values below or equal to 63 and has explicit mapping for values above 64. SMF limits the maximum number of QFIs to 64
   Option 4: QFI may be limited to 6-bit in 5GC when needed.

Another alternative is to enforce QFI limitation only when it is needed. When considering SDAP header format, it has 1-bit for NAS-RQI. The NAS-RQI bit can be used only for QoS Flows where reflective QoS is configured via N2 signalling (i.e., it is fully depending on 5GC configuration whether there is space on RAN2 header or not). Therefore, options may exist for 6-bit QFI and 7-bit QFI. The 6-bit QFI would be used for QoS Flows where NAS flow may be subject for reflective QoS, and 7-bit QFI is used otherwise. This adds over the air overhead efficiency as we would not carry them empty-bit when there is RQA (Reflective QoS Argument) for a specific QoS Flow. This approach would allow RAN to support either 64 Reflective QoS Flows or a maximum of 128 non-reflective QoS Flows per PDU session and implementation would be possible via existing specification mechanisms.

As the NAS reflective QoS support may be optional for UEs to implement, UEs that do not implement the Reflective QoS, would only use the 7-bit QFI format with 128 possible values. No extra processing may be needed.

UE NAS-QFI==AS QFI
RAN NAS-QFI==AS QFI
RAN sends an RRC indication to UE when RQA is configured.

The RRC indication contains either per-QFI configuration or per DRB configuration whether RQI is used in the header. 5GC SMF enforces the limit of 64 reflective QoS flows, and 128 QFIs per PDU session.

5GC enforces the limit that For QFIs>63, reflective QoS is not used in 3GPP access. Option 4 may require from gNB implementation:
   That each QoS Flow is configured separately whether they contain QoS Flow or not
      This option may require that the gNB does not mix QFIs with and without Reflective QoS parameter.
   Alternatively, the 6-bit or 7-bit QFI is configured per DRB.
      UE knows from the DRB configuration whether SDAP is 6-bit or 7-bits.

Option 4: RAN uses 6-bit QFI format with reflective QoS flows and 7-bit format with non-reflective QoS Flows. 5GC does not use Reflective QoS with values exceeding 63 in 5QI table.

Benefit of option 4: Option 4 allows 128 QFIs that may be needed in the future.

Figure 1:
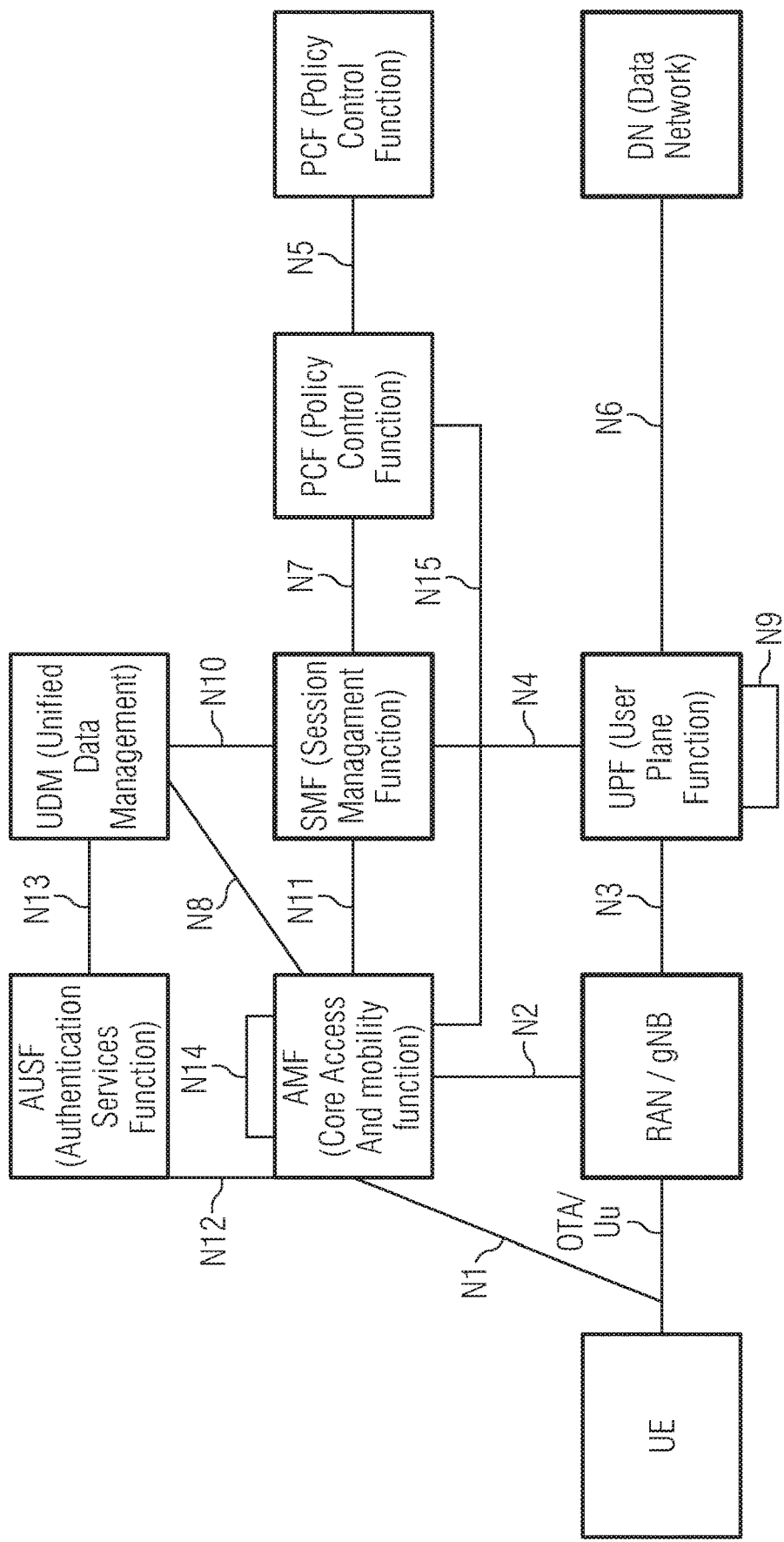
FIG. 1 is thus a block diagram illustrating elements of a 5G architecture.
Figure 2:
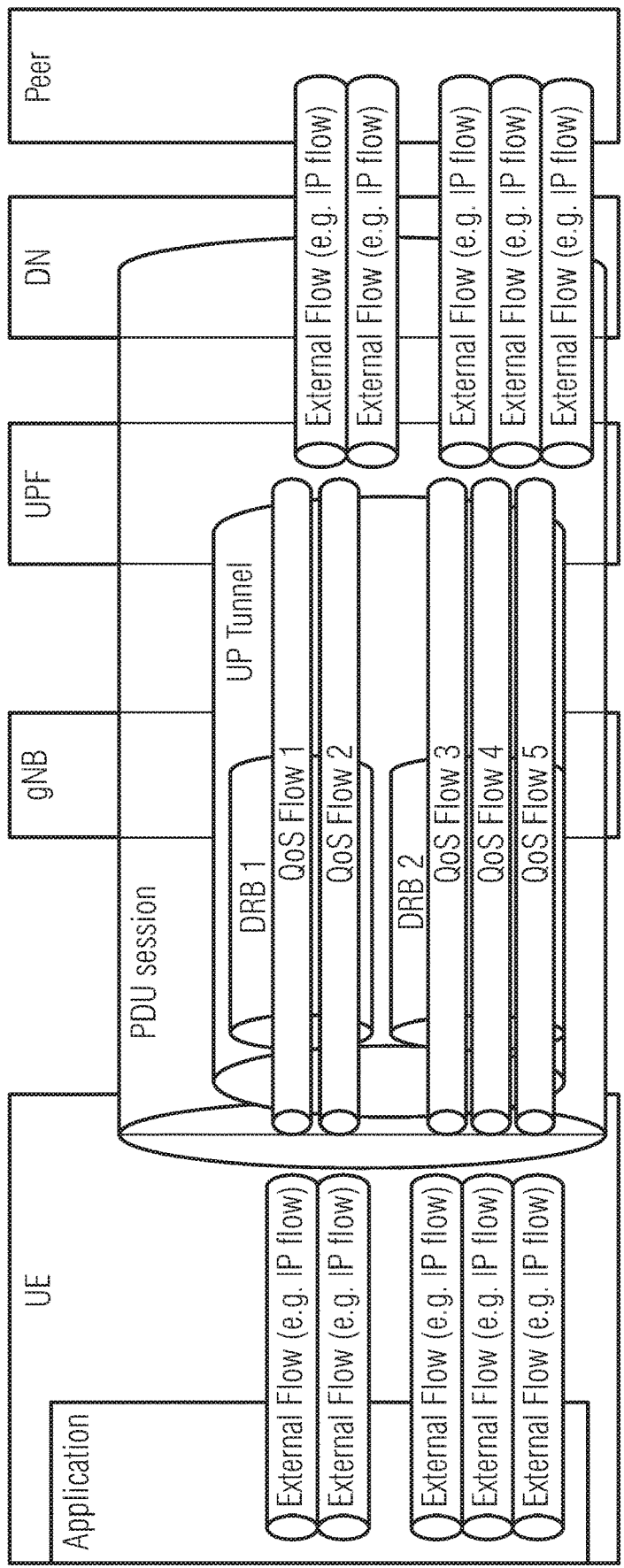
FIG. 2 is a diagram illustrating High-level components of a 5G QoS system.
Figure 3:
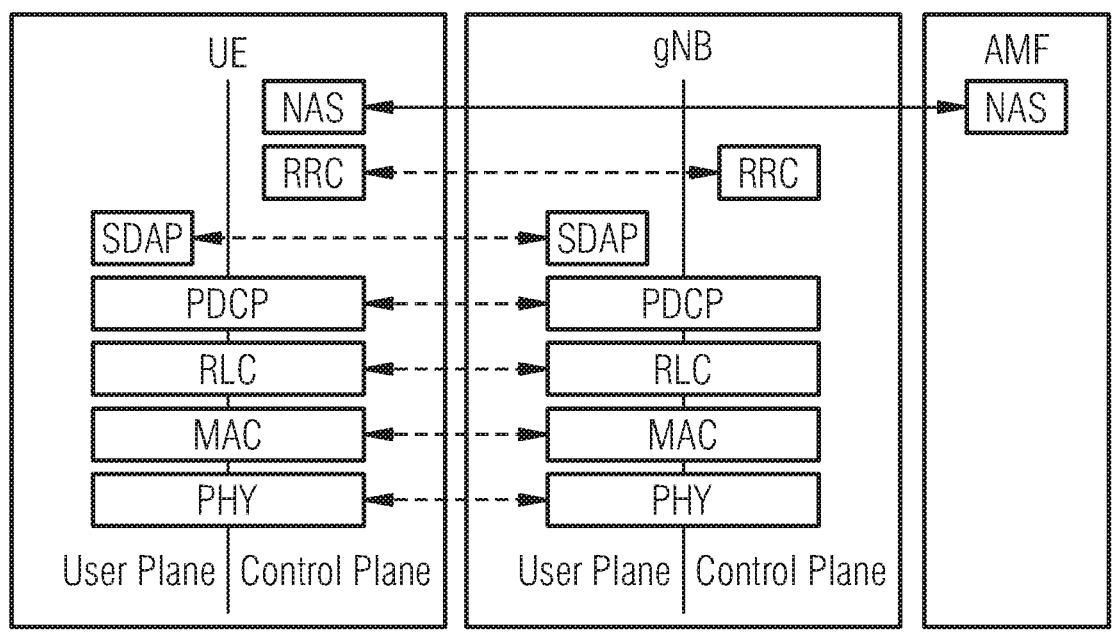
FIG. 3 is a diagram illustrating an overall RAN protocol architecture.
Figure 4:
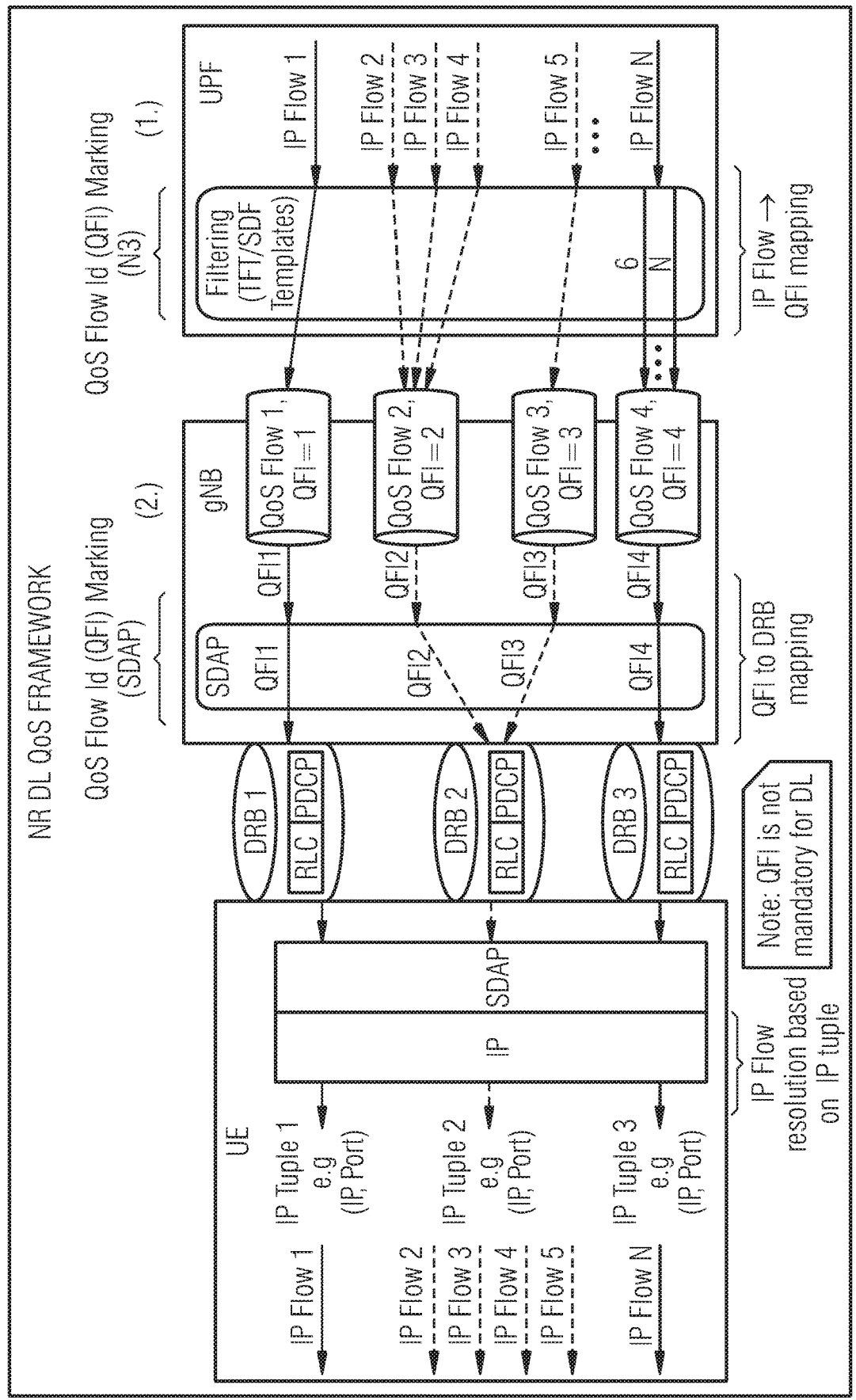
FIG. 4 is a diagram illustrating an overview of the downlink DL QoS Framework for New Radio NR.
Figure 5:
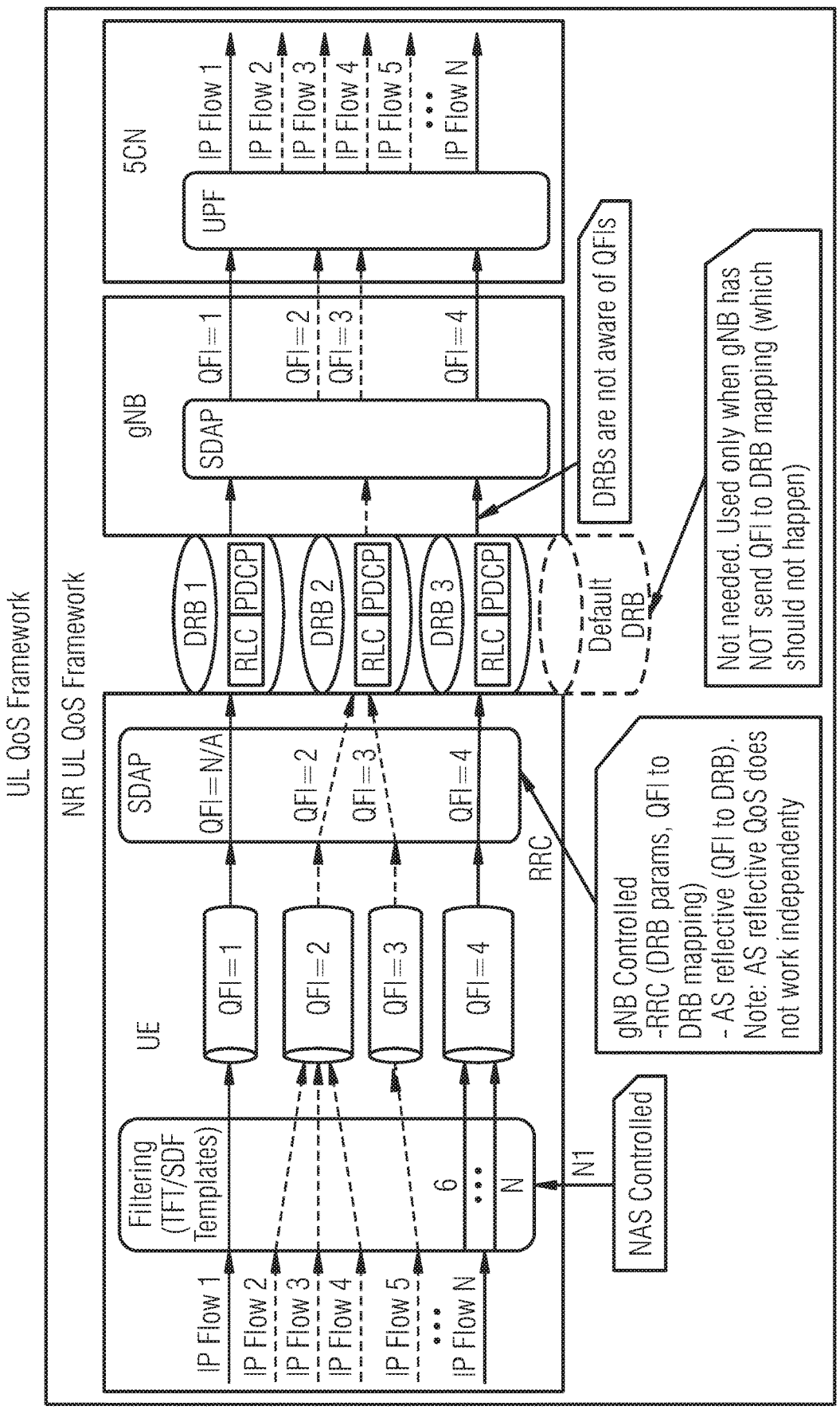
FIG. 5 is a diagram illustrating an UpLink UL QoS framework.
Figure 6:
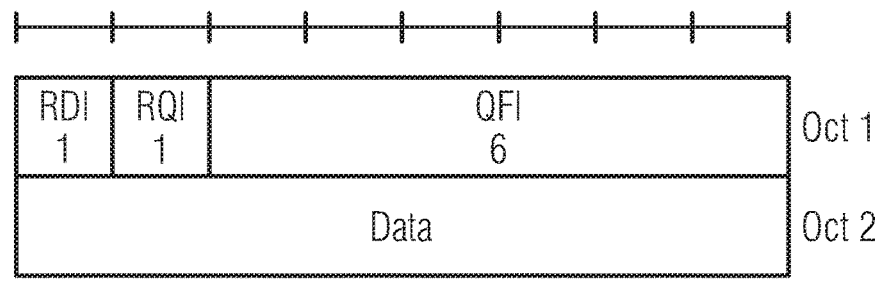
FIG. 6 is a diagram illustrating an SDAP header with 6-bit QFI according to some embodiments of inventive concepts.
Figure 7:
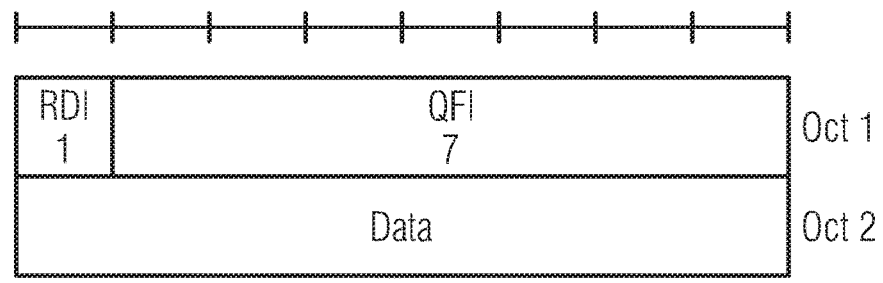
FIG. 7 illustrates an SDAP header with 7-bit QFI according to some embodiments of inventive concepts.

On option 4, There would be two options for SDAP header:
   FIG. 6 illustrates an SDAP header with 6-bit QFI.
   FIG. 7 illustrates an SDAP header with 7-bit QFI.

The following table summarizes different options based on effort that is required from each entity. While option 3 is tempting from RAN2 point of view, it may not be accepted by SA2. Therefore, the option 4 may provide a compromise on complexity and implementation effort.

TABLE 1

Comparison of options. Low is good, high is bad.

|  | UE | RAN | CN |
|---|---|---|---|
| Option 1 | High | High | Low |
| Option 2 | High | High | Low |
| Option 3 | Medium | Medium | Low |
| Option 4 | Low | Low | Low |

This following portions of the disclosure provide additional information how the options could be implemented according to some embodiments of inventive concepts.

RAN Triggering Conditions:
Option 1& 2:
   Upon receiving DL traffic from N3 interface or QoS Flow is configured
      gNB always maps QFI to local QFI and sends NAS-QFI to AS-QFI mapping in RRC RadioBearerConfig (Sdap-config) to UE
   Upon receiving traffic from higher layer, UE must
      Map NAS-QFI to AS-QFI based on mapping send on Sdap-config
   gNB maintains map (e.g. bitmap) on used QoS Flow values per PDU session.
   Upon receiving DL traffic from N3 interface or QoS Flow is configured
      When new QoS Flow is configured
         If the QoS flow value>63
         Find available QFI value
         Send indication to UE that the NAS-QFI and AS-QFI are different. This information can be sent in RadiobearerConfig (SdapConfig) to UE.

Option 3:
  5GC needs to have a table of QFI values per PDU session (for instance UPF). This table contains information about the mapped QFIs. When QFI is taken into use, it is written to the table.
  5GC SMF
    Limit the maximum number of QFIs per PDU session to 64.
  5GC UPF: If QFI is greater than value 63
    Find free QFI value from the QFI value table
    Signal QFI value to the gNB and UE. Also signal associated QoS parameters.
    Always mark 6-bit QFI in N3 header.
Option 4
  When gNB receives RQA parameter from N2 interface
    gNB sends in RRC RadioBearerConfig containing information on QoS Flows that are reflective
    gNB makes this decision based on existence of RQA argument associated with the QFI
  For the QFIs that RQA parameter has been received via N2 configuration, 6-bit QFI is used.
  UE:
    DL: UE checks DRB configuration whether DRB contains reflective QFIs or not and reads the QFI value accordingly (either 6-bit or 7-bit value)
    UL UE checks whether QFI is reflective (either by checking individual QFI configuration or if QFI is associated with reflective DRB).
      Based on the lookup, UE associated either 6-bit or 7-bit QFI to the SDAP header.
  gNB: Upon receiving DL traffic from N3 interface
    Implementation option 1: Copy 7-bit QFI from the N3 header, if the MSB 7th bit is '1'->High value range is in use. Use 7-bit SDAP header for this. For instance, QFI=010 0000, MSB==0->QFI<64. Use 6-bit QFI on SDAP header. This can be also done with bitmask (if (QFI & b'100 0000>0) □ QFI>64)
    Implementation option 2: Read 7-bit QFI value, If RQA parameter is associated with QoS Flow, copy 7-bit QFI value, else copy only 6-bits (UPF makes sure that the value is <64).
  The gNB may implement the QFI to DRB mapping in the way that non-reflective and reflective QoS Flows are mapped into separate DRBs.
  5GC UPF:
    Always mark 7-bit QFI on SDAP header
  5GC SMF: Limit the maximum number of reflective QoS flows to 64,
  Don't use reflective QoS with the 5QI values greater than 63.
  Inter gNB handover is discussed below.
  In the case where gNB maintains NAS-QFI to AS-QFI mapping (option 1,2), this mapping needs to be conveyed from source gNB to the target gNB via Xn signalling.
  In the case where gNB maintains information (e.g. list associated with QFI values and whether QFI is reflective or not) about reflectiveness of the QFI, either on QFI level or DRB level. This information needs to be carried to from source to target gNB via Xn Signalling. In option 4, this allows the target gNB to know whether to configure 6-bit or 7 bit QFI for DL and whether to expect 6-bit or 7-bit QFI for UL.
  Similar procedure applies for E-UTRA and NR handovers.

Specification implementation of the option 4 is discussed below.
SDAP implementation (based on version 3GPP TS 37.324 V1.3.0 (2018 January)
  SDAP PROCEDURES
  SDAP entity handling
  SDAP entity establishment
  When RRC [3] requests an SDAP entity establishment for a PDU session, the UE shall:
    establish an SDAP entity for the PDU session;
    associate the SDAP entity with a default DRB.
  SDAP entity release
  When RRC [3] requests an SDAP entity release for a PDU session, the UE shall:
    release the SDAP entity for the PDU session.
  Data transfer
  Uplink
  At the reception of an SDAP SDU from upper layer for a QoS flow, the transmitting SDAP entity shall:
    if there is no stored QoS flow to DRB mapping rule for the QoS flow as specified in the subclause 5.3:
      map the SDAP SDU to the default DRB;
    else:
      map the SDAP SDU to the DRB according to the stored QoS flow to DRB mapping rule;
    if the DRB to which the SDAP SDU is mapped is configured by RRC [3] with the presence of SDAP header,
    if reflective QoS is configured by RRC for the QoS Flow DRB
      construct the SDAP PDU as specified in the subclause 6.2.2.2-1;
    else:
      construct the SDAP PDU as specified in the subclause 6.2.2.2-2;
    else:
      construct the SDAP PDU as specified in the subclause 6.2.2.1;
    deliver the constructed SDAP PDU to the lower layers.
  Downlink
  At the reception of an SDAP PDU from lower layers for a QoS flow, the receiving SDAP entity shall:
    if the DRB from which this SDAP PDU is received is configured by RRC [3] with the presence of SDAP header:
      perform reflective QoS flow to DRB mapping as specified in the subclause 5.3.2;
      perform RQI handling as specified in the subclause 5.4;
      if reflective QoS is configured by RRC for the QoS Flow DRB
        retrieve the SDAP SDU from the SDAP PDU as specified in the subclause 6.2.2.2-1;
      else:
        retrieve the SDAP SDU from the SDAP PDU as specified in the subclause 6.2.2.2-2;
    else:
      retrieve the SDAP SDU from the SDAP PDU as specified in the subclause 6.2.2.1;
    deliver the retrieved SDAP SDU to the upper layer.
  QoS flow to DRB mapping
  Configuration
  When RRC [3] configures an UL QoS flow to DRB mapping rule for an SDAP entity, the SDAP entity shall:
    store the UL QoS flow to DRB mapping rule.

Reflective mapping
For each received DL SDAP PDU with RDI set to 1, the SDAP entity shall:
  process the QFI field in the SDAP header and store the QoS flow to DRB mapping of the DL SDAP PDU as the QoS flow to DRB mapping rule for the UL.
DRB release
When a DRB is released, the SDAP entity shall:
  remove all QoS flow to DRB mappings associated with the released DRB.
RQI handling
For each received DL SDAP PDU with RQI set to 1, the SDAP entity shall:
  inform the NAS layer that the RQI bit is set to 1.
Data PDU with SDAP header FIG. 6 illustrates a format of an SDAP Data PDU of a DownLink DL with SDAP header being configured with RDI, RQI, and a 6-bit QFI.

FIG. 7 illustrates a format of an SDAP Data PDU of a DownLink DL with SDAP header being configured with RDI and 7-bit QFI.

Figure 11:
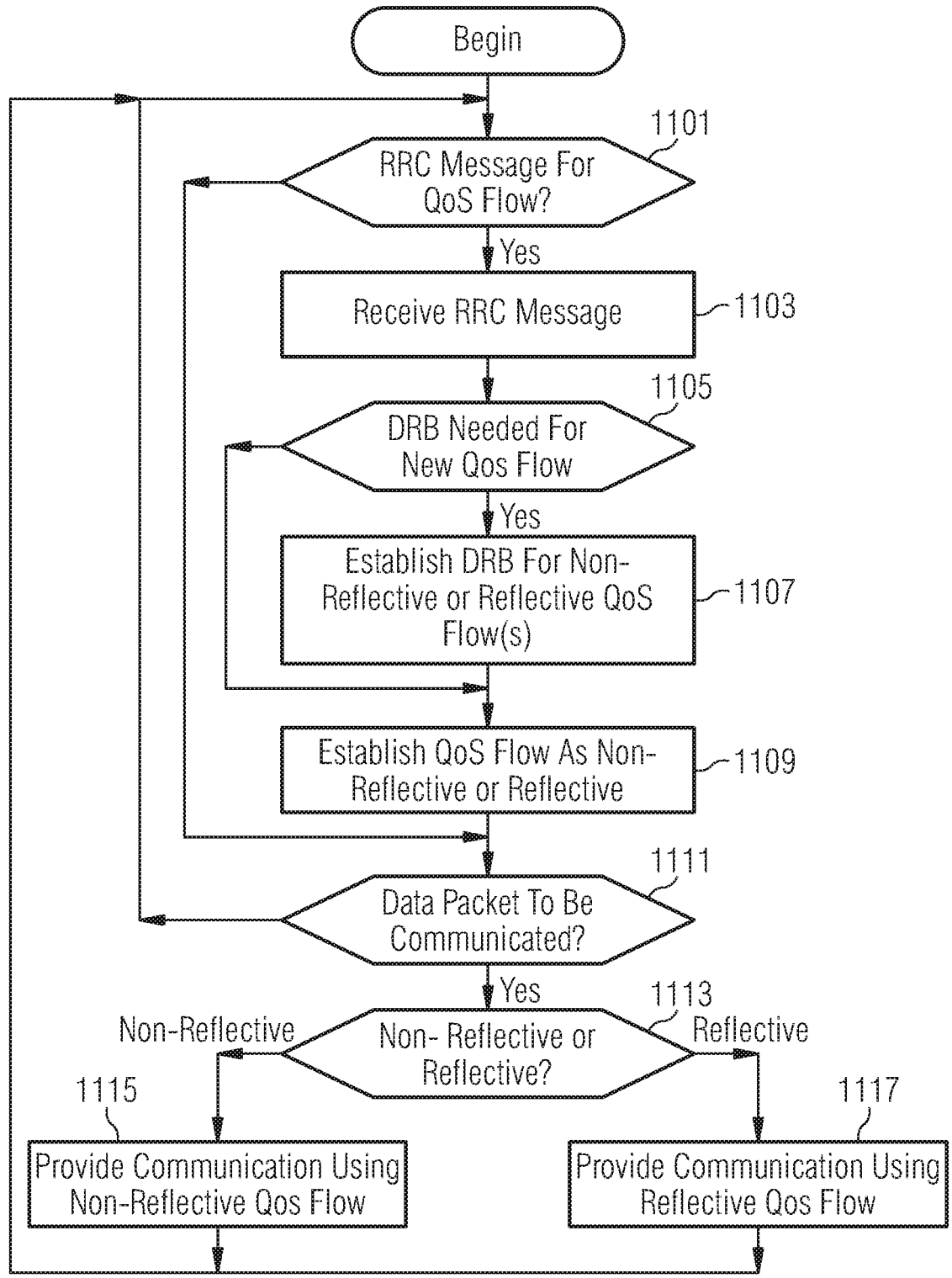
FIG. 11 is a flow chart illustrating operations of a wireless terminal UE according to some embodiments of inventive concepts.
Figure 12:
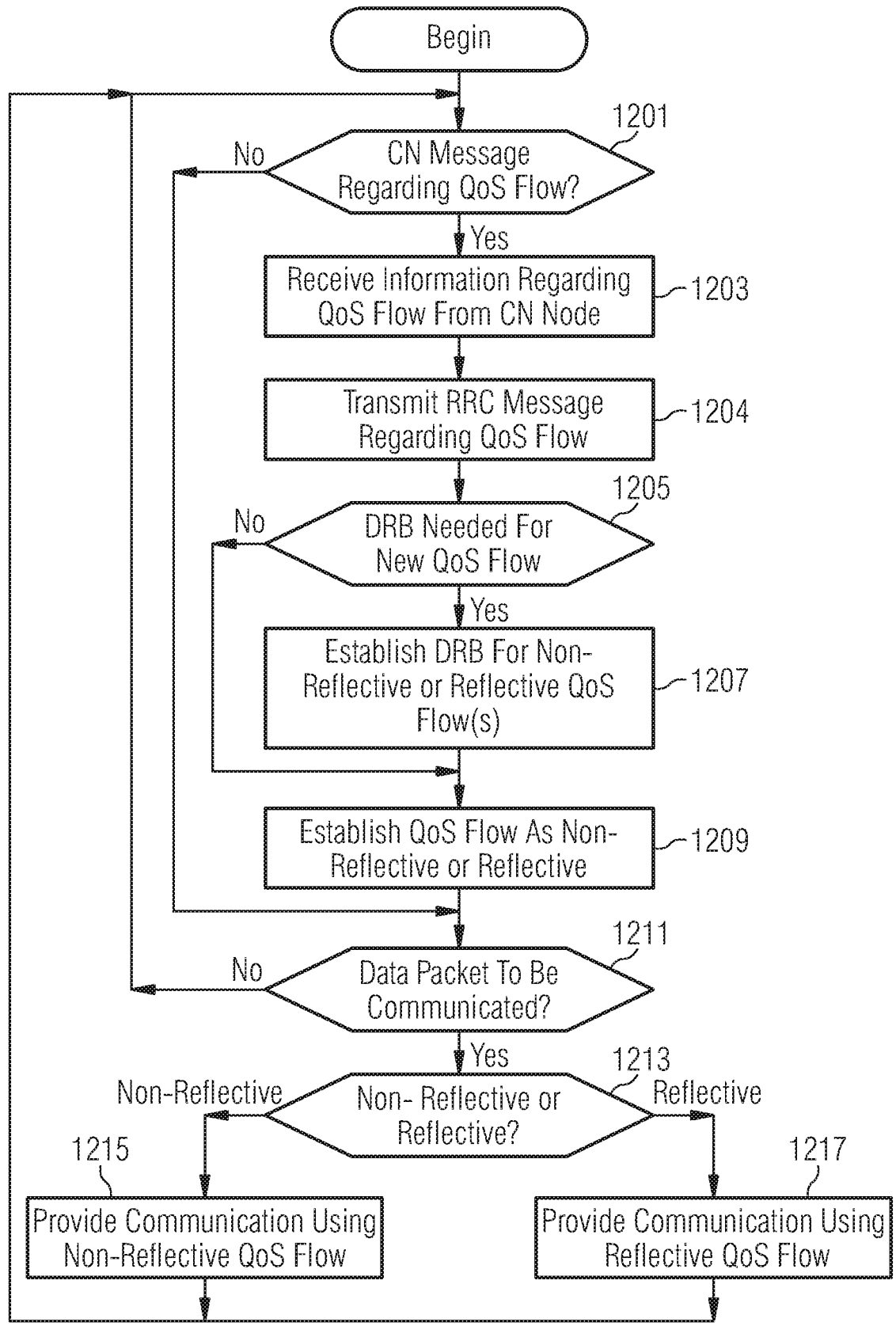
FIG. 12 is a flow chart illustrating operations of a base station (gNB or eNB) according to some embodiments of inventive concepts.
Figure 13:
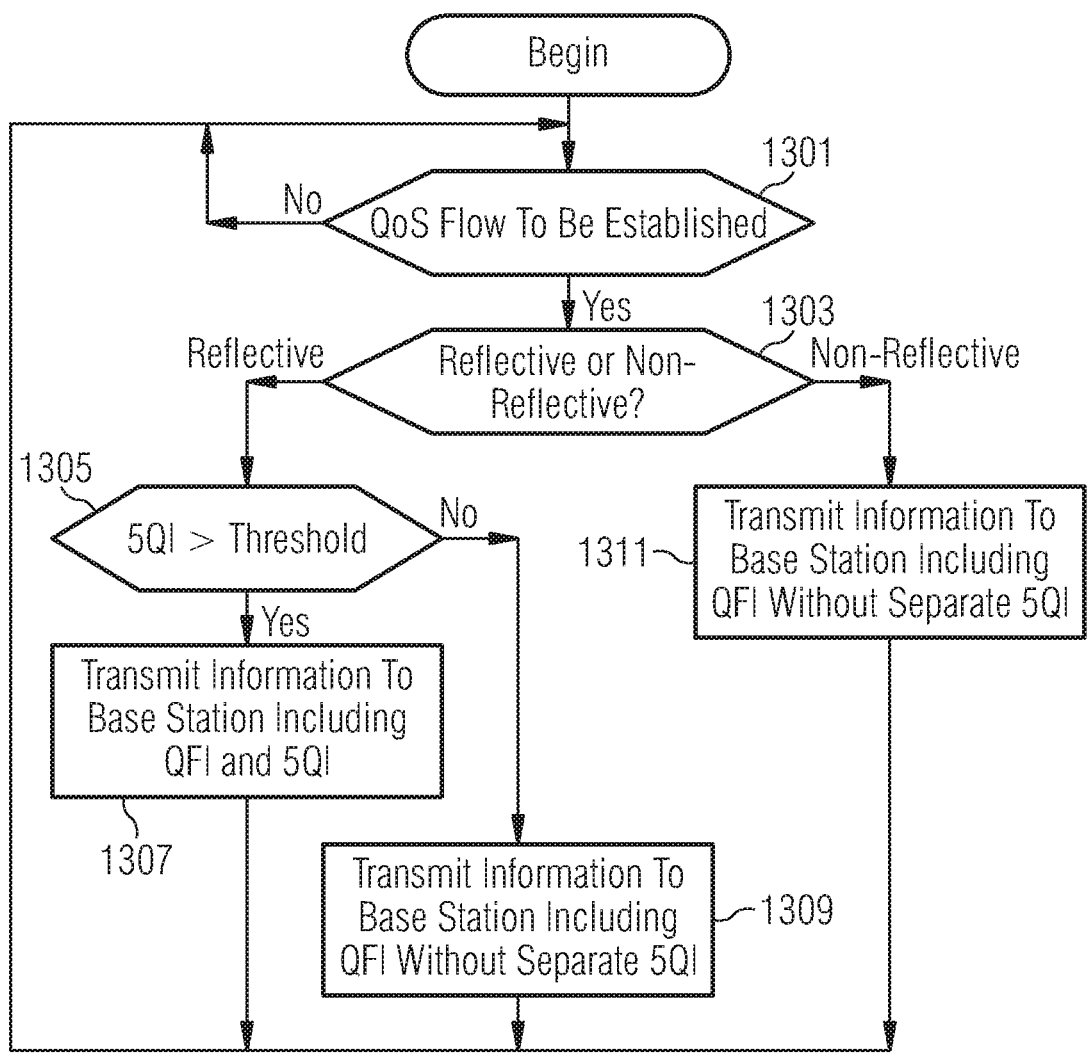
FIG. 13 is a flow chart illustrating operations of a core network CN node according to some embodiments of inventive concepts.

FIG. 11 illustrates operations of a wireless terminal UE (e.g., operations of wireless terminal processor 803), FIG. 12 illustrates operations of a base station (e.g., operations of base station processor 903), and FIG. 13 illustrates operations of a core network CN node (e.g., operations of processor 1003). Various operations of FIGS. 11, 12, and/or 13 may be optional with respect to some embodiments of inventive concepts. For example, operations 1101, 1105, 1107, 1109, 1111, 1113, and 1117 of FIG. 11 may be optional with respect to Example Embodiment 1; operations 1101, 1103, 1105, 1107, 1109, 1111, and 1113, and 1115 or 1117 of FIG. 11 may be optional with respect to Example Embodiment 15; operations 1201, 1205, 1207, 1209, 1211, 1213, and 1217 of FIG. 12 may be optional with respect to Example Embodiments 27; operations 1201, 1203, 1204, 1205, 1207, 1209, 1211, and 1213, and 1215 or 1217 of FIG. 12 may be optional with respect to Example Embodiment 41; and operations 1301, 1309, and 1311 may be optional with respect to Example Embodiment 54.

As noted above, FIG. 11 illustrates operations of a wireless terminal UE. According to some embodiments illustrated in FIG. 11, processor 803 may receive a Radio Resource Control RRC message from the base station through transceiver 801 at blocks 1101 and 1103. The RRC message may include information regarding at least one Quality of Service QoS flow being reflective and/or non-reflective. For example, the information from the RRC message may identify a first data radio bearer DRB as a DRB for non-reflective QoS flows, and the information from the RRC message may identify a second DRB as a DRB for reflective QoS flows.

At blocks 1105 and 1107, processor 803 may establish the first DRB for non-reflective QoS flows between the wireless terminal and the base station and the second DRB for reflective QoS flows between the wireless terminal and the base station based on the information from the RRC message. According to some embodiments, the information for the first and second DRBs may be provided in a single RRC message. According to some other embodiments, the information for the first and second DRBs may be provided in different RRC messages.

If a data packet is to be communicated through transceiver 801 at block 1111, processor 803 may determine at block 1113 whether the data packet should be communicated using a non-reflective or reflective DRB.

For example, processor 803 may provide communication of a first data packet through transceiver 801 at block 1115 between the wireless terminal and the base station using the non-reflective QoS flow over the first DRB, wherein the first data packet includes a first data field and a first Service Data Application Protocol SDAP header field with a QoS Flow Identity QFI, and wherein the QFI is used for the data packet based on the information from the RRC message.

At block 1117, processor 803 may provide communication of a second data packet between the wireless terminal and the base station using a reflective QoS flow over the second DRB, wherein the second data packet includes a second data field and a second SDAP header field with a QFI that is used for the second data packet based on the information from the RRC message, and wherein a length of the QFI of the second SDAP header field is less than a length of the QFI of the first SDAP header field.

The QFI of the first SDAP header field may be a 7 bit QFI, and the QFI of the second SDAP header field may be a 6 bit QFI.

The first SDAP header field may include the QFI of the first SDAP header field and a Reflective QoS to DRB mapping Indication RDI without a Reflective QoS Indicator RQI, and the second SDAP header field may include the QFI of the second SDAP header field, an RQI of the second SDAP header field, and an RDI.

Moreover, a format of the first SDAP header field may be determined based on the first QoS flow for the first DRB being a non-reflective QoS flow, and a format of the second SDAP header field may be determined based on the second QoS flow for the second DRB being a reflective QoS flow.

As noted above, FIG. 12 illustrates operations of a base station. According to some embodiments illustrated in FIG. 11 at blocks 1201 and 1203, processor 903 may receive information from a Core Network CN node (through network interface 907) regarding at least one Quality of Service QoS flow being reflective and/or non-reflective. The information from the CN node may identifies one QoS flow as being a non-reflective QoS flow and another QoS flow as being a reflective QoS flow. For example, the information from the CN node may identify a first data radio bearer DRB as a DRB for non-reflective QoS flows, and the information from the RRC message may identify a second DRB as a DRB for reflective QoS flows.

At block 1204, processor 903 may transmit a Radio Resource Control RRC message through transceiver 901 to the wireless terminal based on the information regarding at least one Quality of Service QoS flow being reflective and/or non-reflective. The RRC message, for example, may include information regarding the first DRB being a DRB for non-reflective QoS flows and the second DRB being a DRB for reflective QoS flows.

At blocks 1205, 1207, and/or 1209, processor 903 may establish the first DRB for non-reflective QoS flows between the base station and the wireless terminal, and processor 903 may establish the second DRB for reflective QoS flows between the base station and the wireless terminal.

If a data packet is to be communicated through transceiver 901 at block 1211, processor 903 may determine at block 1213 whether the data packet should be communicated using a non-reflective or reflective DRB.

For example, processor 903 may provide communication of a first data packet through transceiver 901 between the base station and the wireless terminal using the non-reflective QoS flow over the first DRB at block 1215, wherein the first data packet includes a first data field and a first Service Data Application Protocol SDAP header field with a QoS Flow Identity QFI, and wherein the QFI is used for the data packet based on the information from the CN node.

At block 1217, processor 903 may provide communication of a second data packet through transceiver 901 between the base station and the wireless terminal using a reflective QoS flow over the second DRB, wherein the second data packet includes a second data field and a second SDAP header field with a QFI, that is used for the second data packet based on the information from the CN node, and wherein a length of the QFI of the second SDAP header field is less than a length of the QFI of the first SDAP header field.

The QFI of the first SDAP header field may be a 7 bit QFI, and the QFI of the second SDAP header field may be a 6 bit QFI.

The first SDAP header field may include the QFI of the first SDAP header field and a Reflective QoS to DRB mapping Indication RDI without a Reflective QoS Indicator RQI, and the second SDAP header field may include the QFI of the second SDAP header field, an RQI of the second SDAP header field, and an RDI.

A format of the first SDAP header field may be determined based on the non-reflective QoS flow being a non-reflective QoS flow, and a format of the second SDAP header field may be determined based on the reflective QoS flow being a reflective QoS flow.

For example, the first SDAP header field (corresponding to the non-reflective QoS flow) may have a format including a QoS Flow Identity QFI and a Reflective QoS flow to DRB mapping Indication RDI responsive to the respective QoS flow being a non-reflective QoS flow. The QFI of the first SDAP header field may be a 7 bit QFI, the RDI of the first SDAP may be a 1 bit RDI, and the first SDAP header field may be provided with the QFI and the RDI without a Reflective QoS Indicator, RQI.

The second SDAP header field (corresponding to the reflective QoS flow) may have a format including a QoS Flow Identity QFI, a Reflective QoS Indicator RQI, and a 1 bit Reflective QoS flow to DRB mapping Indication RDI responsive to the QoS flow being a reflective QoS flow.

As noted above, FIG. 13 illustrates operations of a base station. If a QoS flow is to be established at block 1301, processor 1003 may determine at block 1303 whether the QoS flow is to be non-reflective or reflective.

For a reflective QoS flow, processor 1003 may determine at block 1305 whether a 5G QoS indicator 5QI has a value greater than a threshold.

Responsive to determining at blocks 1303 and 1305 that a reflective Quality of Service QoS flow will be established for a 3GPP access between a base station (g NB or eNB) and a wireless terminal (UE) using a 5G QoS indicator 5QI having a value greater than a threshold, processor 1003 at block 1307 may transmit information regarding the reflective QoS flow through network interface 1007 to the base station, wherein the information regarding the reflective QoS flow includes a QoS Flow Identity QFI and the 5QI having the value greater than the threshold. In this case, the QFI may be a 6 bit QFI, and the 5QI may have a value greater than 64.

Responsive to determining at blocks 1303 and 1305 that a reflective QoS flow will be established for a 3GPP access between the base station and the wireless terminal using a 5QI having a value less than the threshold, processor 1003 may at block 1309 transmit information regarding the second reflective QoS flow through network interface 1007 to the base station, wherein the information regarding the second reflective QoS flow includes a second QFI that maps to the second 5QI having the value less than the threshold without separately including the second 5QI. In this case, the second QFI may be a 6 bit QFI, and the 5QI may have a value less than 63.

Responsive to determining at block 1303 that a non-reflective QoS flow will be established for the 3GPP access between the base station and the wireless terminal (UE), processor 1003 may transmit at block 1311 information regarding the non-reflective QoS flow through network interface 1007 to the base station, wherein the information regarding the non-reflective QoS flow includes a second QFI that maps to the second 5QI having the value greater than the threshold without separately including the second 5QI.

Example Embodiments of inventive concepts are discussed below.

1. A method of operating a wireless terminal (UE) in communication with a base station, gNB, the method comprising:

receiving (1103) a Radio Resource Control, RRC, message from the base station, wherein the RRC message includes information regarding at least one Quality of Service, QoS, flow being reflective and/or non-reflective; and providing (1115) communication of a data packet between the wireless terminal and the base station using a non-reflective QoS flow, wherein the data packet includes a data field and a Service Data Application Protocol, SDAP, header field with a QoS Flow Identity, QFI, and wherein the QFI is used for the data packet based on the information from the RRC message.

2. The method of Embodiment 1, wherein the data packet is a first data packet, the data field is a first data field, and the SDAP header field is a first SDAP header field, the method further comprising:

providing (1117) communication of a second data packet between the wireless terminal and the base station using a reflective QoS flow, wherein the second data packet includes a second data field and a second SDAP header field with a QFI that is used for the second data packet based on the information from the RRC message, and wherein a length of the QFI of the second SDAP header field is less than a length of the QFI of the first SDAP header field.

3. The method of Embodiment 2, wherein the information from the RRC message identifies the reflective QoS flow as being a reflective QoS flow.

4. The method of any of Embodiments 2-3, further comprising:

establishing (1107) a first Data Radio Bearer, DRB, between the wireless terminal and the base station; and establishing (1107) a second DRB between the wireless terminal and the base station;

wherein providing communication of the first data packet comprises providing communication of the first data packet using the non-reflective QoS flow over the first DRB;

wherein providing communication of the second data packet comprise providing communication of the second data packet using the reflective QoS flow over the second DRB.

5. The method of Embodiment 4, where the information from the RRC message identifies the first DRB as a DRB for non-reflective QoS flows, and/or wherein the information from the RRC message identifies the second DRB as a DRB for reflective QoS flows.

6. The method of any of Embodiments 2-5, wherein the QFI of the second SDAP header field is a 6 bit QFI.

7. The method of any of Embodiments 2-6, wherein the first SDAP header field includes the QFI of the first SDAP header field and a Reflective QoS to DRB mapping Indication, RDI, without a Reflective QoS Indicator, RQI, and wherein the second SDAP header field include the QFI of the second SDAP header field, an RQI of the second SDAP header field, and an RDI.

8. The method of Embodiment 1, further comprising:
establishing (1107) a Data Radio Bearer, DRB, between the wireless terminal and the base station;
wherein providing communication of the data packet comprises providing communication of the data packet using the non-reflective QoS flow over the DRB.

9. The method of Embodiment 8, wherein the information from the RRC message identifies the DRB as a DRB for non-reflective QoS flows.

10. The method of any of Embodiments 1-9, wherein the information from the RRC message identifies the non-reflective QoS flow as being a non-reflective QoS flow.

11. The method of any of Embodiments 1-10, wherein providing communication comprises transmitting the data packet from the wireless terminal to the base station over the non-reflective QoS flow.

12. The method of any of Embodiments 1-10, wherein providing communication comprises receiving the data packet at the wireless terminal from the base station over the non-reflective QoS flow.

13. The method of any of Embodiments 1-12 wherein the QFI of the SDAP header field is a 7 bit QFI.

14. The method of any of Embodiments 1-13 wherein the SDAP header field is provided with the QFI and with a Reflective QoS flow to DRB mapping Indication, RDI, without a Reflective QoS Indicator, RQI.

15. A method of operating a wireless terminal (UE) in communication with a base station, gNB, the method comprising:
providing (1115, 1117) communication of a data packet between the wireless terminal and the base station using a Quality of Service, QoS, flow, wherein the QoS flow is either a reflective QoS flow or a non-reflective QoS flow, wherein the data packet includes a data field and a Service Data Application Protocol, SDAP, header field, and wherein a format of the SDAP header field is determined based on the QoS flow being a reflective QoS flow or a non-reflective QoS flow.

16. The method of Embodiment 15, wherein the QoS flow is a non-reflective QoS flow, and wherein the SDAP header field has a format including a QoS Flow Identity, QFI, and a Reflective QoS flow to DRB mapping Indication, RDI, responsive to the QoS flow being a non-reflective QoS flow.

17. The method of Embodiment 16, wherein the QFI is a 7 bit QFI, and the RDI is a 1 bit RDI.

18. The method of any of Embodiments 16-17, wherein the SDAP header field is provided with the QFI and the RDI without a Reflective QoS Indicator, RQI.

19. The method of Embodiment 15, wherein the QoS flow is a reflective QoS flow, and wherein the SDAP header field has a format including a QoS Flow Identity, QFI, a Reflective QoS Indicator, RQI, and a Reflective QoS flow to DRB mapping Indication, RDI, responsive to the QoS flow being a reflective QoS flow.

20. The method of Embodiment 19, wherein the data packet is a first data packet, the QoS flow is a first QoS flow, the data field is a first data field, and the SDAP header field is a first SDAP header field, the method further comprising:
providing (1115) communication of a second data packet between the wireless terminal and the base station using a second Quality of Service, QoS, flow, wherein the second QoS flow is a non-reflective QoS flow, wherein the second data packet includes a second data field and a second SDAP header field, and wherein the second SDAP header field has a format including a QoS Flow Identity, QFI, and a Reflective QoS flow to DRB mapping Indication, RDI, responsive to the QoS flow being a non-reflective QoS flow, and wherein the QFI of the second SDAP header field is longer than the QFI of the first SDAP header field.

21. The method of Embodiment 20 further comprising:
establishing (1107) a first Data Radio Bearer, DRB, between the wireless terminal and the base station; and
establishing (1107) a second DRB between the wireless terminal and the base station;
wherein providing communication of the first data packet comprises providing communication of the first data packet using the first QoS flow over the first DRB;
wherein providing communication of the second data packet comprise providing communication of the second data packet using the second QoS flow over the second DRB.

22. The method of any of Embodiments 15-21 further comprising:
receiving (1103) a Radio Resource Control, RRC, message from the base station, wherein the RRC message includes information regarding at least one QoS, flow being reflective and/or non-reflective, wherein the format of the header field is determined based on the QoS flow being a reflective QoS flow or a non-reflective QoS flow using the information from the RRC message.

23. The method of any of Embodiments 15-22, wherein providing communication comprises transmitting the data packet from the wireless terminal to the base station over the QoS flow.

24. The method of any of Embodiments 15-22, wherein providing communication comprises receiving the data packet at the wireless terminal from the base station over the QoS flow.

25. A wireless terminal (UE), wherein the wireless terminal is adapted to perform operations according to any of Embodiments 1-24.

26. A wireless terminal (UE) comprising:
a transceiver (801) configured to provide wireless communication in a wireless communication network; and
a processor (803) coupled with the transceiver, wherein the processor is configured to provide wireless communication with the wireless communication network through the transceiver, wherein the processor is further configured to perform operations according to any of Embodiments 1-24.

27. A method of operating a base station, gNB, of a wireless communication network in communication with a wireless terminal (UE), the method comprising:
receiving (1203) information from a Core Network, CN, node regarding at least one Quality of Service, QoS, flow being reflective and/or non-reflective;
transmitting (1204) a Radio Resource Control, RRC, message to the wireless terminal based on the information regarding at least one Quality of Service, QoS, flow being reflective and/or non-reflective; and
providing (1215) communication of a data packet between the base station and the wireless terminal using a non-reflective QoS flow, wherein the data packet includes a data field and a Service Data Application Protocol, SDAP, header field with a QoS Flow Identity, QFI, and wherein the QFI is used for the data packet based on the information from the CN node.

28. The method of Embodiment 27, wherein the data packet is a first data packet, the data field is a first data field, and the SDAP header is a first SDAP header, the method further comprising:

providing (1217) communication of a second data packet between the base station and the wireless terminal using a reflective QoS flow, wherein the second data packet includes a second data field and a second SDAP header field with a QFI, that is used for the second data packet based on the information from the CN node, and wherein a length of the QFI of the second SDAP header field is less than a length of the QFI of the first SDAP header field.

29. The method of Embodiment 28, wherein the information from the CN node identifies the reflective QoS flow as being a reflective QoS flow.

30. The method of any of Embodiments 28-29, further comprising:
establishing (1207) a first Data Radio Bearer, DRB, between the base station and the wireless terminal; and
establishing (1207) a second DRB between the base station and the wireless terminal;
wherein providing communication of the first data packet comprises providing communication of the first data packet using the non-reflective QoS flow over the first DRB;
wherein providing communication of the second data packet comprise providing communication of the second data packet using the reflective QoS flow over the second DRB.

31. The method of Embodiment 30, where the information from the CN node identifies the first DRB as a DRB for non-reflective QoS flows, and/or wherein the information from the RRC message identifies the second DRB as a DRB for reflective QoS flows.

32. The method of any of Embodiments 28-31, wherein the QFI of the second SDAP header field is a 6 bit QFI.

33. The method of any of Embodiments 28-32, wherein the first SDAP header field includes the QFI of the first SDAP header field and a Reflective QoS to DRB mapping Indication, RDI, without a Reflective QoS Indicator, RQI, and wherein the second SDAP header field include the QFI of the second SDAP header field, an RQI of the second SDAP header field, and an RDI.

34. The method of Embodiment 27, further comprising:
establishing (1207) a Data Radio Bearer, DRB, between the base station and the wireless terminal;
wherein providing communication of the data packet comprises providing communication of the data packet using the non-reflective QoS flow over the DRB.

35. The method of any of Embodiments 27-34, wherein the information from the CN node identifies the non-reflective QoS flow as being a non-reflective QoS flow.

36. The method of any of Embodiments 27-35, wherein providing communication comprises transmitting the data packet from the base station to the wireless terminal over the non-reflective QoS flow.

37. The method of any of Embodiments 27-36, wherein providing communication comprises receiving the data packet at the base station from the wireless terminal over the non-reflective QoS flow.

38. The method of any of Embodiments 27-37, wherein the information from the CN node comprises a Reflective QoS attribute, RQA.

39. The method of any of Embodiments 27-38, wherein the QFI of the SDAP header field is a 7 bit QFI.

40. The method of any of Embodiments 27-39, wherein the SDAP header field is provided with the QFI and with a Reflective QoS flow to DRB mapping Indication, RDI, without a Reflective QoS Indicator, RQI.

41. A method of operating a base station, gNB, of a wireless communication network in communication with a wireless terminal (UE), the method comprising:

providing (1215, 1217) communication of a data packet between the base station and the wireless terminal using a Quality of Service, QoS, flow, wherein the QoS flow is either a reflective QoS flow or a non-reflective QoS flow, wherein the data packet includes a data field and a Service Data Application Protocol, SDAP, header field, and wherein a format of the SDAP header field is determined based on the QoS flow being a reflective QoS flow or a non-reflective QoS flow.

42. The method of Embodiment 41, wherein the QoS flow is a non-reflective QoS flow, and wherein the SDAP header field has a format including a QoS Flow Identity, QFI, and a Reflective QoS flow to DRB mapping Indication, RDI, responsive to the QoS flow being a non-reflective QoS flow.

43. The method of Embodiment 42, wherein the QFI is a 7 bit QFI, and the RDI is a 1 bit RDI.

44. The method of any of Embodiments 42-43, wherein the SDAP header field is provided with the QFI and the RDI without a Reflective QoS Indicator, RQI.

45. The method of Embodiment 41, wherein the QoS flow is a reflective QoS flow, and wherein the SDAP header field has a format including a QoS Flow Identity, QFI, a Reflective QoS Indicator, RQI, and a 1 bit Reflective QoS flow to DRB mapping Indication, RDI, responsive to the QoS flow being a reflective QoS flow.

46. The method of Embodiment 45, wherein the data packet is a first data packet, the QoS flow is a first QoS flow, the data field is a first data field, and the header field is a first header field, the method further comprising:
providing (1215) communication of a second data packet between the base station and the wireless terminal using a second Quality of Service, QoS, flow, wherein the second QoS flow is a non-reflective QoS flow, wherein the second data packet includes a second data field and a second SDAP header field, and wherein the second SDAP header field has a format including a QoS Flow Identity, QFI, and a Reflective QoS flow to DRB mapping Indication, RDI, responsive to the QoS flow being a non-reflective QoS flow.

47. The method of Embodiment 46 further comprising:
establishing (1207) a first Data Radio Bearer, DRB, between the base station and the wireless terminal; and
establishing (1207) a second DRB between the base station and the wireless terminal;
wherein providing communication of the first data packet comprises providing communication of the first data packet using the first QoS flow over the first DRB;
wherein providing communication of the second data packet comprise providing communication of the second data packet using the second QoS flow over the second DRB.

48. The method of any of Embodiments 41-47 further comprising:
transmitting (1204) a Radio Resource Control, RRC, message from the base station to the wireless terminal, wherein the RRC message includes information regarding at least one QoS, flow being reflective and/or non-reflective.

49. The method of any of Embodiments 41-48, wherein providing communication comprises transmitting the data packet from the base station over the QoS flow to the wireless terminal.

50. The method of any of Embodiments 41-48, wherein providing communication comprises receiving the data packet at the base station over the QoS flow from the wireless terminal.

51. The method of any of Embodiments 51-50 further comprising:

receiving (1203) information from a Core Network, CN, node regarding at least one Quality of Service, QoS, flow being reflective and/or non-reflective, wherein the format of the SDAP header field is determined based on the QoS flow being a reflective QoS flow or a non-reflective QoS flow using the information from the CN node.

52. A base station, gNB, wherein the base station is adapted to perform operations according to any of Embodiments 27-51.

53. A base station, gNB, comprising:

a transceiver (901) configured to provide wireless communication with a wireless terminal;

a network interface (907) configured to provide communication with other nodes of a wireless communication network; and a processor (903) coupled with the transceiver and the network interface, wherein the processor is configured to provide wireless communication with the wireless communication network through the transceiver, wherein the processor is configured to provide network communication with other nodes of the wireless communication network through the network interface, and wherein the processor is further configured to perform operations according to any of Embodiments 27-51.

54. A method of operating a core network, CN, node of a wireless communication network, the method comprising:

determining (1303, 1305) that a reflective Quality of Service, QoS, flow will be established for a 3GPP access between a base station, gNB and a wireless terminal (UE) using a 5G QoS indicator, 5QI, having a value greater than a threshold; and responsive to the reflective QoS flow being established for the 3GPP access using the 5QI having the value greater than the threshold, transmitting (1307) information regarding the reflective QoS flow to the base station, wherein the information regarding the reflective QoS flow includes a QoS Flow Identity, QFI, and the 5QI having the value greater than the threshold.

55. The method of Embodiment 54, wherein the QFI is a 6 bit QFI, and wherein the 5QI has a value greater than 64.

56. The method of any of Embodiments 54-55, wherein the reflective QoS flow is a first reflective QoS flow, the QFI is a first QFI, and wherein the 5QI is a first 5QI, the method further comprising:

determining (1303, 1305) that a second reflective Quality of Service, QoS, flow will be established for the 3GPP access between the base station and the wireless terminal using a second 5QI having a value less than the threshold; and responsive to the second reflective QoS flow being established for the 3GPP access using the second 5QI having the value less than the threshold, transmitting (1309) information regarding the second reflective QoS flow to the base station, wherein the information regarding the second reflective QoS flow includes a second QFI that maps to the second 5QI having the value less than the threshold without separately including the second 5QI.

57. The method of Embodiment 56, wherein the second QFI is a 6 bit QFI, and wherein the 5QI has a value less than 63.

58. The method of Embodiment 54, wherein the QFI is a first QFI, and wherein the 5QI having a value greater than the threshold is a first 5QI, the method further comprising:

determining (1303) that a non-reflective QoS flow will be established for the 3GPP access between the base station and the wireless terminal (UE) using a second 5QI having a value greater than the threshold; and responsive to the non-reflective QoS flow being established for the 3GPP access, transmitting (1311) information regarding the non-reflective QoS flow to the base station, wherein the information regarding the non-reflective QoS flow includes a second QFI that maps to the second 5QI having the value greater than the threshold without separately including the second 5QI.

59. The method of Embodiment 58, wherein the second QFI is longer than the first QFI.

60. The method of any of Embodiments 58-59, wherein the second QFI is a 7 bit QFI, and wherein the 5QI has a value greater than 64.

61. A core network, CN, node, wherein the CN node is adapted to perform operations according to any of Embodiments 54-60.

62. A core network, CN, node comprising:

a network interface (1007) configured to provide communication with other nodes of a wireless communication network; and a processor (1003) coupled with the network interface, wherein the processor is configured to provide network communication with other nodes of the wireless communication network through the network interface, and wherein the processor is further configured to perform operations according to any of Embodiments 54-60.

Explanations are provided below for abbreviations/acronyms used herein.

| Abbreviation | Explanation |
| --- | --- |
| 5GC | 5G Core Network |
| 5CN | 5G Core Network |
| 5G-AN | 5G Access Network |
| 5GS | 5G System |
| 5QI | 5G QoS Indicator |
| AF | Application Function |
| AMF | Access and Mobility Management Function |
| AMF | Access and Mobility Management Function |
| AS | Access Stratum |
| CP | Control Plane |
| DL | Downlink |
| DN | Data Network |
| DNN | Data Network Name |
| GFBR | Guaranteed Flow Bit Rate |
| gNB | NR NodeB |
| MFBR | Maximum Flow Bit Rate |
| NAI | Network Access Identifier |
| NCGI | NR Cell Global Identifier |
| NCR | Neighbour Cell Relation |
| NEF | Network Exposure Function |
| NF | Network Function |
| NG-RAN | NG Radio Access Network |
| NR | New Radio |
| NRF | Network Repository Function |
| PCF | Policy Control Function |
| PEI | Permanent Equipment Identifier |
| PFDF | Packet Flow Description Function |
| QFI | QoS Flow Identity |
| QoE | Quality of Experience |
| RLAU | RAN-based Location Area Update |
| RNA | RAN Notification Area |
| SA NR | Standalone New Radio |
| SBA | Service Based Architecture |
| SBI | Service Based Interface5G |
| SDAP | Service Data Adaptation Protocol |
| SDSF | Structured Data Storage Function |
| SMF | Session Management Function |
| SUPI | Subscriber Permanent Identifier |
| UDSF | Unstructured Data Storage Function |
| UL | Uplink |
| UL CL | Uplink Classifier |

| Abbreviation | Explanation |
| --- | --- |
| UPF | User Plane Function |
| Xn-C | Xn-Control plane |
| Xn-U | Xn-User plane |
| CN | Core Network (e.g. 5CN) |

Embodiments herein are described within the context of 3GPP NR radio technology (3GPP TS 38.300 V15.0.0 (2017 December)). It should be understood that problems and solutions described herein may be equally applicable to wireless access networks and user-equipments (UEs) implementing other access technologies and standards. NR is used as an example technology where embodiments may be suitable and using NR in the description therefore may be useful for understanding problems and solutions addressing such problems. For example, some embodiments may also be applicable to 3GPP LTE, or 3GPP LTE and NR integration, also denoted as non-standalone NR, or EN-DC (EU-TRA-NR dual connectivity).

Information regarding References 1 and 2 is provided below.
1. 3GPP TS 23.501 V15.0.0 (2017 December), Technical Specification Group Services and System Aspects; System Architecture for the 5G System; Stage 2 (Release 15)
2. 3GPP TS 37.324 V1.2.0 (2018 March), Technical Specification Group Radio Access Network; E-UTRA and NR; Service Data Adaptation Protocol (SDAP) specification (Release 15)
3. 3GPP TS 38.300 V15.0.0 (2017 December), Technical Specification Group Radio Access Network; NR; NR and NG-RAN Overall Description; Stage 2 (Release 15)

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a wireless terminal (UE) in communication with a base station, the method comprising:
   receiving a Radio Resource Control (RRC) message from the base station, the RRC message including information regarding a plurality of Quality of Service (QoS) flows that are each either reflective or non-reflective, and the RRC message identifying a first Data Radio Bearer (DRB) as a DRB for non-reflective QoS flows, and/or identifying a second DRB as a DRB for reflective QoS flows;
   receiving a first data packet from the base station using a non-reflective QoS flow, the first data packet comprising a first data field and a first Service Data Application Protocol (SDAP) header field with a QoS Flow Identity (QFI), the first SDAP header field including the QFI of the first SDAP header field and a Reflective QoS to DRB mapping Indication (RDI);
   receiving a second data packet from the base station using a reflective QoS flow, the second data packet comprising a second data field and a second SDAP header field with a QFI and an RDI;
   responsive to the RDI of the first SDAP header field being set to 1, processing the QFI field in the first SDAP header field; and
   responsive to the RDI being set to 1, storing the QoS flow to DRB mapping of the first data field as the QoS flow to DRB mapping rule for the uplink (UL).

2. The method of claim 1, wherein a length of the QFI of the second SDAP header field being less than a length of the QFI of the first SDAP header field.

3. The method of claims 2, further comprising:
   establishing the first DRB between the UE and the base station;
   establishing the second DRB between the UE and the base station;
   providing communication of the first data packet using the non-reflective QoS flow over the first DRB; and
   providing communication of the second data packet using the reflective QoS flow over the second DRB.

4. The method of claim 3, where the information identifies the first DRB as a DRB for non-reflective QoS flows, and/or wherein the information identifies the second DRB as a DRB for reflective QoS flows.

5. The method of claim 2, wherein the QFI of the second SDAP header field is a 6 bit QFI.

6. The method of claim 1, further comprising:
   providing communication of the data packet using the non-reflective QoS flow over the first DRB.

7. A wireless terminal (UE) in communication with a base station, the UE comprising:
   a transceiver configured to provide wireless communication in a wireless communication network;
   a processor coupled with the transceiver; and
   memory coupled to the processor and having instructions stored therein that are executable by the processor to cause the UE to perform operations comprising:
   providing wireless communication with the wireless communication network through the transceiver;
   receiving a Radio Resource Control (RRC) message from the base station, the RRC message including information regarding a plurality of Quality of Service (QoS) flows that are each either reflective or non-reflective, and identifying a first Data Radio Bearer (DRB) as a DRB for non-reflective QoS flows, and/or identifying a second DRB as a DRB for reflective QoS flows;
   receiving a first data packet from the base station using a non-reflective QoS flow, the first data packet comprising a first data field and a first Service Data Application Protocol (SDAP) header field with a QoS Flow Identity (QFI), the first SDAP header field including the QFI of the first SDAP header field and a Reflective QoS to DRB mapping Indication (RDI);
   receiving a second data packet from the base station using a reflective QoS flow, the second data packet comprising a second data field and a second SDAP header field with a QFI and an RDI;
   responsive to the RDI of the first SDAP header field being set to 1, processing the QFI field in the first SDAP header field; and
   responsive to the RDI of the first SDAP header field being set to 1, storing the QoS flow to DRB mapping of the first data field as the QoS flow to DRB mapping rule for the uplink (UL).

8. The UE of claim 7, wherein a length of the QFI of the second SDAP header field being less than a length of the QFI of the first SDAP header field.

9. The UE of claim 8, the operations further comprising:
   establishing the first DRB between the UE and the base station;
   establishing the second DRB between the UE and the base station;
   providing communication of the first data packet using the non-reflective QoS flow over the first DRB; and
   providing communication of the second data packet using the reflective QoS flow over the second DRB
   where the information identifies the first DRB as a DRB for non-reflective QoS flows, and/or
   wherein the information identifies the second DRB as a DRB for reflective QoS flows.

10. A method of operating a base station of a wireless communication network in communication with a wireless terminal (UE), the method comprising:
    receiving information from a Core Network (CN) node regarding a plurality of Quality of Service (QoS) flows that are each reflective or non-reflective;

transmitting a Radio Resource Control RRC) message to the UE indicative of the information received from the CN, and identifying a first Data Radio Bearer (DRB) as a DRB for non-reflective QoS flows, and/or identifying a second DRB as a DRB for reflective QoS flows;

transmitting a first data packet to the UE using a non-reflective QoS flow, the first data packet comprising a data field and a first Service Data Application Protocol (SDAP) header field with a QoS Flow Identity (QFI) used for the first data packet based on the information from the CN node, the first SDAP header field comprising the QFI of the first SDAP header field and a Reflective QoS to DRB mapping indication (RDI); and providing communication of a second data packet between the base station and the UE using a reflective QoS flow.

11. The method of claim 10, wherein the second data packet comprising a second data field and a second SDAP header field that comprises a QFI that is used for the second data packet based on the information from the CN node.

12. The method of claim 11, wherein the second SDAP header field further comprises a RDI and a Reflective QoS Indicator ("RQI"),
wherein a length of the QFI of the second SDAP header field is less than a length of the QFI of the first SDAP header field, and
wherein the RQI indicates that the second data packet is subject to reflective QoS flow handling.

13. The method of claim 11, where the information identifies the first DRB as a DRB for non-reflective QoS flows, and/or
wherein the information identifies the second DRB as a DRB for reflective QoS flows.

14. The method of claim 11, wherein the QFI of the second SDAP header field is a 6 bit QFI.

15. The method of claim 11, wherein the second SDAP header field further comprises the QFI of the second SDAP header field, an RQI of the second SDAP header field, and an RDI.

16. The method of claim 10, further comprising:
establishing a first DRB between the base station and the UE; and
establishing a second DRB between the base station and the UE;
providing communication of the first data packet using the non-reflective QoS flow over the first DRB;
providing communication of the second data packet using the reflective QoS flow over the second DRB.

17. The method of claim 10, further comprising:
establishing a DRB between the base station and the UE;
providing communication of the data packet using the non-reflective QoS flow over the DRB.

18. A base station of a wireless communication network that includes a wireless terminal (UE), the base station comprising:
a transceiver configured to provide wireless communication with the UE;
a network interface configured to provide communication with other nodes of the wireless communication network;
a processor coupled with the transceiver and the network interface; and
memory coupled to the processor and having instructions stored therein that are executable by the processor to cause the base station to perform operations comprising:
receiving information from a Core Network (CN) node regarding a plurality of Quality of Service (QoS) flows each being reflective or non-reflective;
transmitting a Radio Resource Control (RRC) message to the UE indicative of the information received from the CN, and identifying a first Data Radio Bearer (DRB) as a DRB for non-reflective QoS flows, and/or identifying a second DRB as a DRB for reflective QoS flows;
transmitting a first data packet to the UE using a non-reflective QoS flow, the first data packet comprising a data field and a first Service Data Application Protocol (SDAP) header field with a QoS Flow Identity (QFI) used for the first data packet based on the information from the CN node, the first SDAP header field comprising the QFI of the first SDAP header field and a Reflective QoS to DRB mapping Indication (RDI); and
providing communication of a second data packet between the base station and the UE using a reflective QoS flow.

19. The base station of claim 18, wherein the second data packet comprising a second data field and a second SDAP header field that comprises a QFI that is used for the second data packet based on the information from the CN node.

20. The base station of claim 19, wherein the second SDAP header field further comprises a RDI and a Reflective QoS Indicator ("RQI"),
wherein a length of the QFI of the second SDAP header field is less than a length of the QFI of the first SDAP header field, and
wherein the RQI indicates that the second data packet is subject to reflective QoS flow handling.

* * * * *